(12) United States Patent
Sumiyoshi et al.

(10) Patent No.: US 8,495,870 B2
(45) Date of Patent: Jul. 30, 2013

(54) WORK MACHINE

(75) Inventors: Ryohei Sumiyoshi, Sakai (JP);
Kazuyoshi Arii, Wakayama (JP);
Kunihiro Suzuki, Sakai (JP)

(73) Assignee: Kubota Corporation, Osaka (JP)

( * ) Notice: Subject to any disclaimer, the term of this patent is extended or adjusted under 35 U.S.C. 154(b) by 806 days.

(21) Appl. No.: 12/724,941

(22) Filed: Mar. 16, 2010

(65) Prior Publication Data
US 2010/0236233 A1    Sep. 23, 2010

(30) Foreign Application Priority Data

Mar. 19, 2009  (JP) ................................. 2009-068456
May 22, 2009  (JP) ................................. 2009-124253
May 22, 2009  (JP) ................................. 2009-124254
May 22, 2009  (JP) ................................. 2009-124255

(51) Int. Cl.
*F16H 61/42*    (2010.01)

(52) U.S. Cl.
USPC ................................. 60/444; 60/484; 60/445

(58) Field of Classification Search
USPC ................... 60/444, 445, 484, 486
See application file for complete search history.

(56) References Cited

U.S. PATENT DOCUMENTS

| | | | | |
|---|---|---|---|---|
| 5,235,811 | A * | 8/1993 | Arii et al. | 60/484 |
| 6,666,023 | B2 * | 12/2003 | Nagura et al. | 60/444 |
| 6,990,757 | B2 * | 1/2006 | Takemura et al. | 37/347 |
| 7,165,397 | B2 * | 1/2007 | Raszga et al. | 60/422 |
| 7,740,254 | B2 * | 6/2010 | Takemura et al. | 280/124.111 |

FOREIGN PATENT DOCUMENTS

| | | | |
|---|---|---|---|
| JP | 06058411 A | | 3/1994 |
| WO | WO 2007037107 A1 * | | 4/2007 |

* cited by examiner

*Primary Examiner* — Thomas E Lazo
(74) *Attorney, Agent, or Firm* — The Webb Law Firm

(57) ABSTRACT

Disclosed is a work machine having a traveling apparatus and a work implement driven by an engine. A hydraulic system mounted on the work machine includes an HST pump comprising a swash plate, variable displacement pump driven by the engine, an HST motor connected in a closed circuit to the HST pump and a pair of speed-changing oil passageways, the HST motor being driven by an amount of oil supplied by the HST pump, thereby to drive the traveling apparatus, a main pump driven by the engine, the main pump supplying pressure oil to the work implement, a pilot pump driven by the engine, a swash plate positioning circuit configured to effect positioning of a swash plate of the HST pump with pilot oil supplied from the pilot pump, and a bleed circuit configured to drain, via a throttle, a portion of the pilot oil supplied to the swash plate positioning circuit.

13 Claims, 15 Drawing Sheets

WORK MACHINE

BACKGROUND OF THE INVENTION

1. Field of the Invention

The present invention relates to a work machine such as a truck loader, a skid loader, etc. in which a traveling apparatus is driven via an HST (hydrostatic transmission) configured to drive an HST motor by an HST pump comprising a swash plate, variable displacement pump driven by an engine.

2. Description of the Related Art

As an example of a work machine including a traveling apparatus driven via an HST, there is known a machine including an HST pump comprising a swash plate, variable displacement pump, an HST motor connected in a closed circuit to this HST pump and a pair of speed-changing oil passageways and configured to be driven by discharge oil from the HST pump to drive a traveling apparatus, a charge circuit for supplementing an amount of oil from a charge pump to the speed-changing oil passageways, a charge relief valve for determining the circuit pressure of the charge circuit, a flushing valve for allowing escape of a portion of the work oil of the low-pressure side of the speed-changing oil passageways, a flushing relief valve incorporated in a flushing relief oil passageway for draining oil from the flushing valve, and a servo cylinder for controlling a swash plate of the HST pump so as to vary the discharge capacity of the HST pump according to the discharge rate from the charge pump (see JP 6-058411A).

In the case of a work machine configured such that its traveling apparatus is driven via an HST, if a significant load is applied to the HST motor during traveling, this load will be transmitted to the engine via the HST pump, so the rotational speed of the engine will be reduced, thus presenting the risk of stall of the engine. On the other hand, in the case of the construction described in JP 6-058411A, there is provided an anti-stall feature (anti-stall function). With this feature, when the rotational speed of the engine decreases, the rotational speed of the charge pump decreases also to reduce the discharge amount of this charge pump, whereby a control pressure of the servo cylinder is reduced, so that the swash plate angle of the HST pump is automatically adjusted so as to reduce the rotational speed of the HST pump. As a result, the load to the engine is reduced, thus providing an anti-stall feature (anti-stall function) for preventing engine stall.

In JP 6-058411A, as a method of improving the anti-stall feature for allowing the control pressure of the servo cylinder to drop more speedily in response to reduction in the rotational speed of the engine, it is conceivable to increase the amount of escape of the oil from the flushing relief valve or to increase the amount of escape of the oil from the charge relief valve. However, if the amount of the escape of the oil from the flushing relief valve is increased, due to the corresponding increase of the oil introduced to the flushing valve, e.g. malfunction of this flushing valve may occur. Further, there is a limit in increasing the amount of escape of the oil from the charge relief valve. Therefore, there is a limit in improvement of the anti-stall feature with these methods.

Further, in the case of an arrangement wherein the rotational speed of the engine is detected and a controller effects a control so that the control pressure of the swash plate of the HST pump is dropped speedily in response to application of excessive load to the engine, this will result in great complexity of the construction, thus inviting cost increase.

In view of the above-described problems, the object of the present invention is to provide a work machine that allows improvement of the anti-stall feature with simple arrangement.

SUMMARY OF THE INVENTION

The above-noted object is fulfilled according to an aspect of the present invention as under:—

A work machine having a traveling apparatus and a work implement driven by an engine,
wherein a hydraulic system mounted on the work machine comprises:
- an HST pump comprising a swash plate, variable displacement pump driven by the engine,
- an HST motor connected in a closed circuit to the HST pump and a pair of speed-changing oil passageways, the HST motor being driven by an amount of oil supplied by the HST pump, thereby to drive the traveling apparatus,
- a main pump driven by the engine, the main pump supplying pressure oil to the work implement,
- a pilot pump driven by the engine,
- a swash plate positioning circuit configured to effect positioning of a swash plate of the HST pump with pilot oil supplied from the pilot pump, and
- a bleed circuit configured to drain, via a throttle, a portion of the pilot oil supplied to the swash plate positioning circuit.

With the above-described characterizing arrangement of the present invention, with the provision of a bleed circuit configured to drain, via a throttle, a portion of the pilot oil supplied to the swash plate positioning circuit, the flow amount of the pilot oil to the swash plate positioning circuit is speedily decreased in response to reduction in the rotational speed of the engine, so that the pilot pressure for controlling the swash plate of the HST pump can be reduced speedily. Hence, it has become possible to provide a work machine which allows improvement in the anti-stall feature with a simple arrangement.

According to one preferred embodiment of the present invention, the hydraulic system further comprises: a charge relief valve for determining the circuit pressure of a charge circuit for supplementing an amount of oil from the pilot pump to the speed-changing oil passageways, and a flushing throttle incorporated in a flushing relief oil passageway for draining oil from a flushing valve configured to allow escape of a portion of work oil in the low-pressure side oil speed-changing passageway of the speed-changing oil passageways.

In the above arrangement, preferably, the flushing relief oil passageway incorporates a flushing relief valve disposed between the flushing valve and the flushing throttle.

According to a further preferred embodiment, the HST motor comprises a swash plate, variable displacement motor switchable between a first speed state and a second speed state, according to the positioning of the swash plate by pilot oil, and for switching over the HST motor from the first speed state to the second speed state, there is provided a second bleed circuit for draining, through a throttle, a portion of pilot oil supplied from the pilot pump.

According to a still further preferred embodiment, the work implement comprises a bucket capable of effecting a scooping/dumping action; and the hydraulic system includes a bucket cylinder for causing the bucket to effect a scooping/dumping action and a bucket control valve for controlling the bucket cylinder; and wherein in a hydraulic circuit at a scooping position where the bucket is caused to effect a scooping action by the bucket control valve, there is provided a bucket bleed circuit for draining, through a throttle, a portion of the pressure oil supplied from the main pump to the bucket cylinder.

With the above-described arrangement, when the work machine is advanced to plunge the bucket into an amount of earth/sand or the like and the bucket is caused to effect a scooping action, the load applied to the hydraulic pump as the driving source of the traveling apparatus is transmitted to the engine thereby to reduce the rotational speed of the engine. In response to this, the discharge amount of the main pump driven by the engine is reduced, so that the ratio of the amount of leak from the bucket bleed circuit relative to this discharge amount is increased correspondingly. Then, the pressure of the pressure oil supplied from the main pump to the bucket cylinder for causing the bucket to effect the scooping action is dropped, thus alleviating the load applied to the main pump. With this, it becomes possible to prevent engine stall which would occur otherwise in such case as high load is applied to the traveling apparatus and the bucket simultaneously.

In the above arrangement, the following construction may be added advantageously.

At the scooping position of the bucket control valve, the pressure oil from the main pump is supplied to a rod side oil chamber of the bucket cylinder.

Further, the bucket control valve includes two pump ports for inputting the pressure oil from the main pump, two cylinder ports for supplying/discharging pressure oil to/from the rod side oil chamber and a bottom side oil chamber of the bucket cylinder, and a tank port communicated to a tank; and at the scooping position of the bucket control valve, one of the pump ports becomes communicated to the tank port via the bucket bleed circuit and also the other pump port becomes communicated to the cylinder port connected to the rod side oil chamber of the bucket cylinder.

Further, the bucket control valve includes a return oil passageway for returning the oil discharged from the bottom side oil chamber of the bucket cylinder to the upstream side of the throttle of the bucket bleed circuit via a check valve, at the scooping position.

Further, the work implement includes the bucket at a leading end of an arm which is pivoted up/down by a lift cylinder operable by the pressure oil from the main pump; and the hydraulic system further comprises:
a lift cylinder for pivoting up/down the arm with the pressure oil from the main pump,
an arm control valve for controlling the lift cylinder;
a work implement operating apparatus for operating the arm control valve and the bucket control valve;
pressure reducing means for reducing a primary pressure of the work implement operating apparatus for preventing full stroke action of the arm control valve, in response to drop in rotational speed of the engine;
wherein said arm control valve and said bucket control valve are disposed in series in a work implement supplying oil passageway for supplying the pressure oil discharged from the main pump, with the arm control valve being disposed on the upstream side of the bucket control valve.

According to a still further preferred embodiment, there is provided a traveling operating apparatus for controlling pilot oil in the swash plate positioning circuit;

there is provided a work implement operating apparatus for controlling the pilot pressure to a control valve for controlling the work implement;

a hydraulic passageway is branched so as to supply the discharge oil from the pilot pump to the traveling operating apparatus and the work implement operating apparatus, and in a hydraulic circuit between this branching point and the traveling operating apparatus, there is provided a pressure compensating valve for ensuring a primary pressure for the work implement operating apparatus, and on the upstream side of the pressure compensating valve, there is provided a work implement bleed circuit for draining, through a throttle, a portion of the pressure oil discharged by the pilot pump and supplied to the work implement operating apparatus.

With the above-described arrangement, when the work machine is advanced to plunge the work implement into earth/sand or the like, the load applied to the hydraulic pump acting as the driving source of the traveling apparatus is transmitted to the engine thereby to reduce the rotational speed of the engine.

In response to this reduction in the rotational speed of the engine, the discharge amount of the pilot pump decreases. So that, the ratio of the amount of leak from the bleed circuit relative to the discharge amount of the pilot pump is increased. With this, it becomes possible to allow the primary pressure of the work implement operating apparatus to drop below a pressure set by the pressure compensating valve.

And, as the primary pressure of the work implement operating apparatus is caused to drop below a pressure set by the pressure compensating valve, the control valve for controlling the work implement becomes unable to effect full stroke action. If the control valve for controlling the work implement does not effect full stroke action, a portion of the pressure oil supplied to the work implement from the main pump to the work implement via the control valve is drained to the drain oil passageway, so that the pressure of the pressure oil from the main pump drops, and the load applied to this main pump is alleviated.

With the above, it becomes possible to prevent engine stall e.g. when high load is applied to the traveling apparatus and the work implement simultaneously.

Advantageously and alternatively, instead of the work implement bleed circuit, on the upstream side of the work implement operating apparatus, there may be provided a pressure reducing valve capable of pressure adjustment so as to allow drop of the primary pressure of the work implement operating apparatus.

According to a still further preferred embodiment, there is provided a traveling operating apparatus for controlling the pilot oil in the swash plate positioning circuit;

the HST pump includes a pair of pressure receiving portions for receiving the pilot pressure from the traveling operating apparatus via a shock relieving throttle, and the angle of the swash plate is controlled by pressure difference between these pressure receiving portions, in the course of which in association with reduction in the rotational speed of the engine, the primary pressure of the traveling operating apparatus drops and the swash plate of the HST pump returns to the neutral side, thus preventing engine stall; and there is provided an escape oil passageway having one end thereof communicated to a primary side hydraulic passageway of the traveling operating apparatus and the other end thereof communicated to a hydraulic passageway between the shock relieving throttle and one of the pressure receiving portions, and the escape oil passageway incorporates a check valve which is opened when the pressure of the one pressure receiving portion to which the other end of the escape oil passageway is communicated is greater than the primary pressure of the traveling operating apparatus.

With this arrangement, when the pressure of the pressure receiving portions to which the other end of the escape oil passageway is communicated is smaller than the primary pressure of the traveling operating apparatus, the check valve is closed, so that the pilot pressure is allowed to communicate via the shock relieving throttle in the hydraulic passageway between the traveling operating apparatus and the pressure receiving portions, thus preventing sudden speed change.

And, when an excessive load is applied suddenly to the engine, thus resulting in sudden drop in the primary pressure of the traveling operating apparatus and the pressure of the pressure receiving portions to which the other end of the escape oil passageway is communicated is greater than the primary pressure of the traveling operating apparatus, the check valve is opened, so that the pressure of the pressure receiving portion is allowed to escape through the escape oil passageway to the primary side of the traveling operating apparatus, and the swash plate of the HST pump returns to the neutral side speedily.

Therefore, sudden speed change is prevented by the shock relieving throttle and at the same time, the response performance of the anti-stall feature can be improved by the simple arrangement of providing a check valve in the escape oil passageway.

Further and other features and advantages resulting therefrom will become apparent upon reading the following detailed description with reference to the accompanying drawings.

In the following description, the respective embodiments will be explained with taking a truck loader as an example of the work machine.

BRIEF DESCRIPTION OF THE DRAWINGS

FIGS. 1-9 show a work machine (truck loader) according to a first embodiment of the present invention; in which, FIG. 1 is a hydraulic circuit diagram showing a hydraulic system of the traveling line, FIG. 2 is a hydraulic circuit diagram of a hydraulic system of the work machine, FIG. 3 is a hydraulic circuit diagram of the implement line, FIG. 4 is an overall side view of a work machine, FIG. 5 is a side view in section showing a portion of the work machine with its cabin being elevated, FIG. 6 is a graph showing an example of pressure characteristics of anti-stall function of the hydraulic system shown in FIG. 1, FIG. 7 is a graph showing a further example of pressure characteristics of anti-stall function of the hydraulic system shown in FIG. 1, FIG. 8 is a graph showing pressure characteristics of anti-stall function relating to a comparison example, FIG. 9 is a graph showing pressure characteristics of anti-stall function relating to a further comparison example, FIGS. 10-15 show a work machine (truck loader) according to a second embodiment of the present invention; in which, FIG. 10 is a hydraulic circuit diagram showing a hydraulic system of the work machine, FIG. 11 is a hydraulic circuit diagram showing a hydraulic system of the traveling line, FIG. 12 is a schematic hydraulic circuit diagram showing the hydraulic system of the traveling line, FIG. 13 is a hydraulic circuit diagram showing a hydraulic system of the implement line, FIG. 14 is a schematic hydraulic circuit diagram showing the hydraulic system of the implement line, and FIG. 15 is a schematic hydraulic circuit diagram showing a further hydraulic system of the implement line.

DETAILED DESCRIPTION OF THE PREFERRED EMBODIMENTS

First Embodiment

First, with reference to FIGS. 1-9, a first embodiment will be described.

Figure 4:
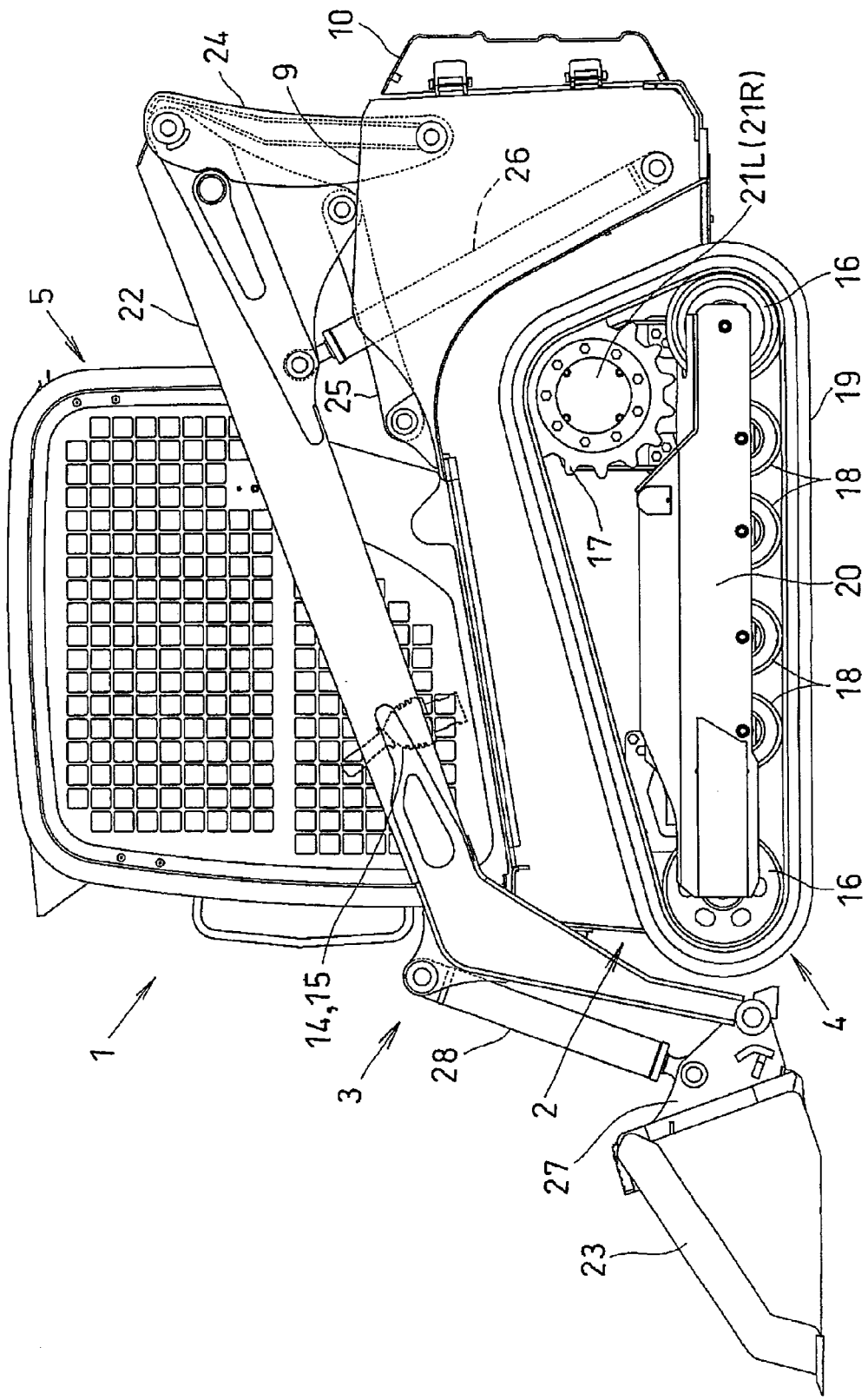
Figure 5:
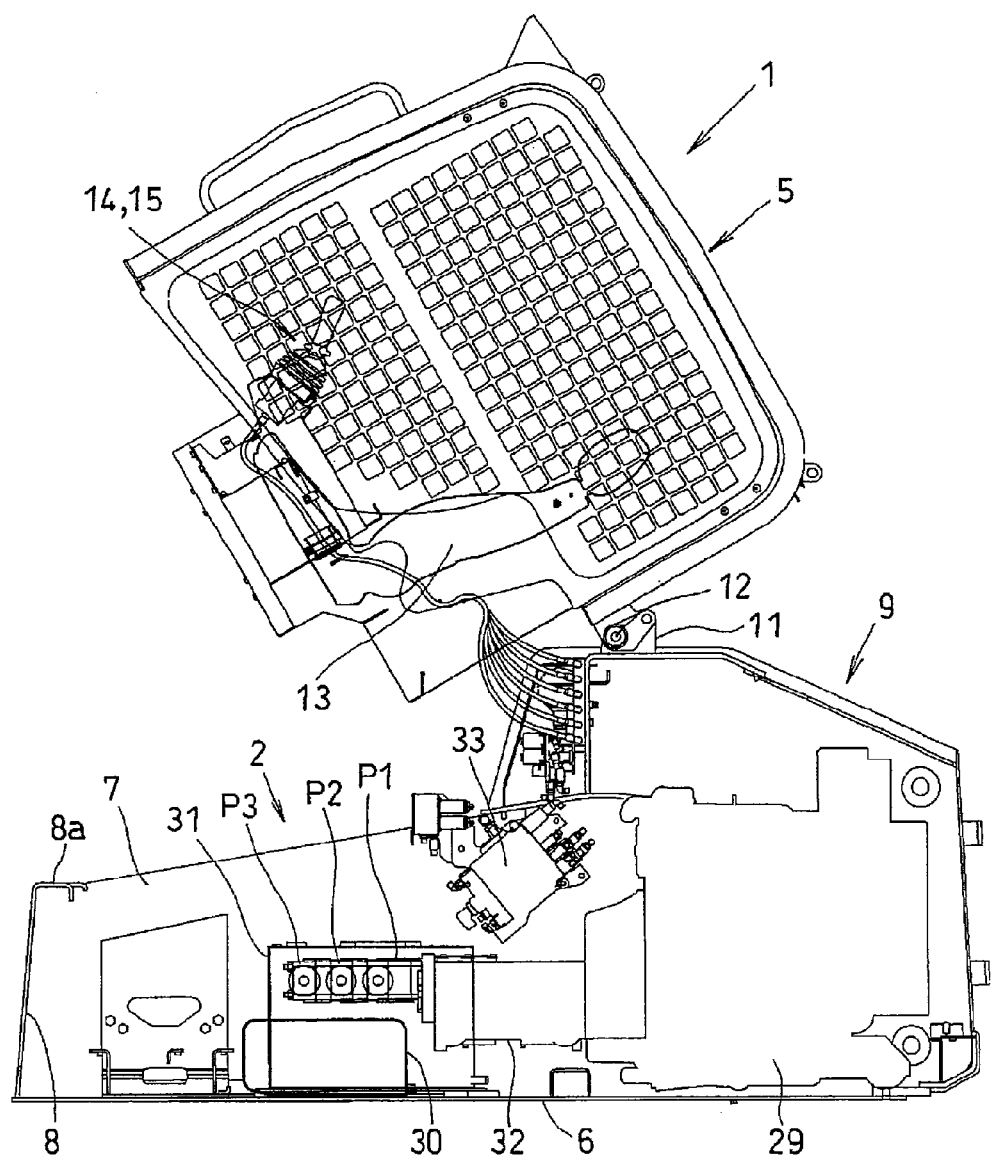

In FIG. 4 and FIG. 5, a work machine 1 (truck loader) relating to the present invention includes a machine body 2, a work implement 3 mounted on the machine body 2, and a pair of right/left traveling apparatuses 4 supporting the machine body 2, and a cabin 5 (driver protecting apparatus) is mounted at an upper portion on the machine body 2, with an offset to the forward side.

The machine body 2 is formed of iron plates or the like, and includes a bottom wall 5, a pair of right/left side walls 7, a front wall 8 and support frames 9 provided at the rear portions of the right/left respective side walls 7. Between the side walls 7, there is formed an upwardly opened space, and at the rear end of this machine body 2, there is provided an openable/closable lid member 10 for closing the rear end opening between the right/left support frames 9.

The cabin 5 is mounted with its front lower end in contact with an upper edge portion 8a of the front wall 8 of the machine body 2 and has a vertical intermediate portion of the rear face thereof supported to be pivotable about a right/left oriented support shaft 12. By pivoting the cabin 5 about the support shaft 12 upwardly, e.g. a maintenance operation of the inside of the machine body 2 is made possible.

Inside the cabin 5, there is provided a driver's seat 13. And, on one of the right/left sides (e.g. the left side) of this driver's seat 13, there is provided a traveling operating apparatus 14 for operating the traveling apparatuses 4 and on the other side of the right/left sides (e.g. the right side) of the driver's seat 13, there is provided an implement operating apparatus 15 for operating the work implement 3.

The upper side of the cabin 5 is closed with a roof and right/left side faces thereof are closed with side walls defining a number of rectangular holes. The rear upper portion of the cabin 5 is closed with a rear glass sheet and at a front/rear center portion of the bottom side is closed with a bottom wall, so that the cabin is formed like a box with its front side open and the front side constitutes an entrance/exit for the driver.

Each one of the right/left traveling apparatuses 4 is constructed as a crawler type traveling apparatus including a pair of front/rear driven wheels 16, a drive wheel 17 disposed upwardly and between the front/rear driven wheels 16, with an offset toward the rear side, a plurality of track rollers 18 disposed between the front/rear driven wheels 16, and an endless belt like crawler belt 19 entrained about and across these front/rear driven wheels 16, the drive wheel 17 and the track rollers 18.

The front/rear driven wheels 16 and the track rollers 18 are mounted to a track frame 20 fixedly attached to the machine body 2 to be rotatable about horizontal axes and the drive wheel 17 is mounted to a rotary drum of a hydraulically driven traveling motor 21L, 21R (wheel motors) mounted to the track frame 20. In operation, as the drive wheel 17 is driven to rotate about a right/left axis by the traveling motor 21L, 21R, the crawler belt 19 is driven to run in circulation in the peripheral direction, whereby the work machine 1 travels forwardly or in reverse.

The work implement 3 includes a pair of right/left arms 22, and a bucket 23 (implement) attached to the leading ends of the arms 22.

The right/left arms 22 are disposed on the right/left opposed sides of the machine body 2 and the cabin 5, with the right/left arms 22 being interconnected via an interconnecting member at their front side intermediate portions thereof.

Each one of the right/left arms 22 has its leading end side vertically pivotable at positions forwardly of the machine body 2, and its base end side (rear end side) supported to be vertically pivotable to the rear upper portion of the machine body 2 via a first lift link 24 and a second lift link 25.

Further, between the base portion of each right/left arm 22 and the rear lower portion of the machine body 2, there is provided a lift cylinder 26 comprising a double-action type hydraulic cylinder. In operation, as the right/left lift cylinders 26 are extended/contracted at one time, the right/left arms 22 are pivoted up/down.

To the leading end of each right/left arm 22, a mounting bracket 27 is connected to be pivotable about a right/left axis, and to these right/left mounting brackets 27, the rear face of the bucket 23 is attached.

Further, between the mounting bracket 27 and the leading end side intermediate portion of the arm 22, there is interposed a tilt cylinder 28 comprising a double action type hydraulic cylinder. In operation, in association with expansion/contraction of this tilt cylinder 28, the bucket 23 is pivoted (the bucket 23 effects a scooping/dumping action).

The bucket 23 is detachably attached to the mounting brackets 27. When the bucket 23 is detached and any one of various kinds of attachments (a hydraulically driven implement) is attached to the mounting brackets 27, various kinds of work other than excavating (or other type of excavating work) are made possible.

At a rear portion on the bottom wall 6 of the machine body 2, an engine 29 is mounted and at a front portion on the bottom wall 6 of the machine body 2, there are mounted a fuel tank 30 and a work oil tank 31.

Forwardly of the engine 29, there is provided a hydraulic drive apparatus 32 for driving the right/left traveling motors 21L, 21R, and forwardly of this hydraulic drive apparatus 32, first through third pumps P1, P2, P3 are provided. At a front/rear intermediate portion of the right side wall 7 of the machine body 2, there is provided a control valve 33 (hydraulic controlling apparatus) for the work implement 3.

Figure 2:
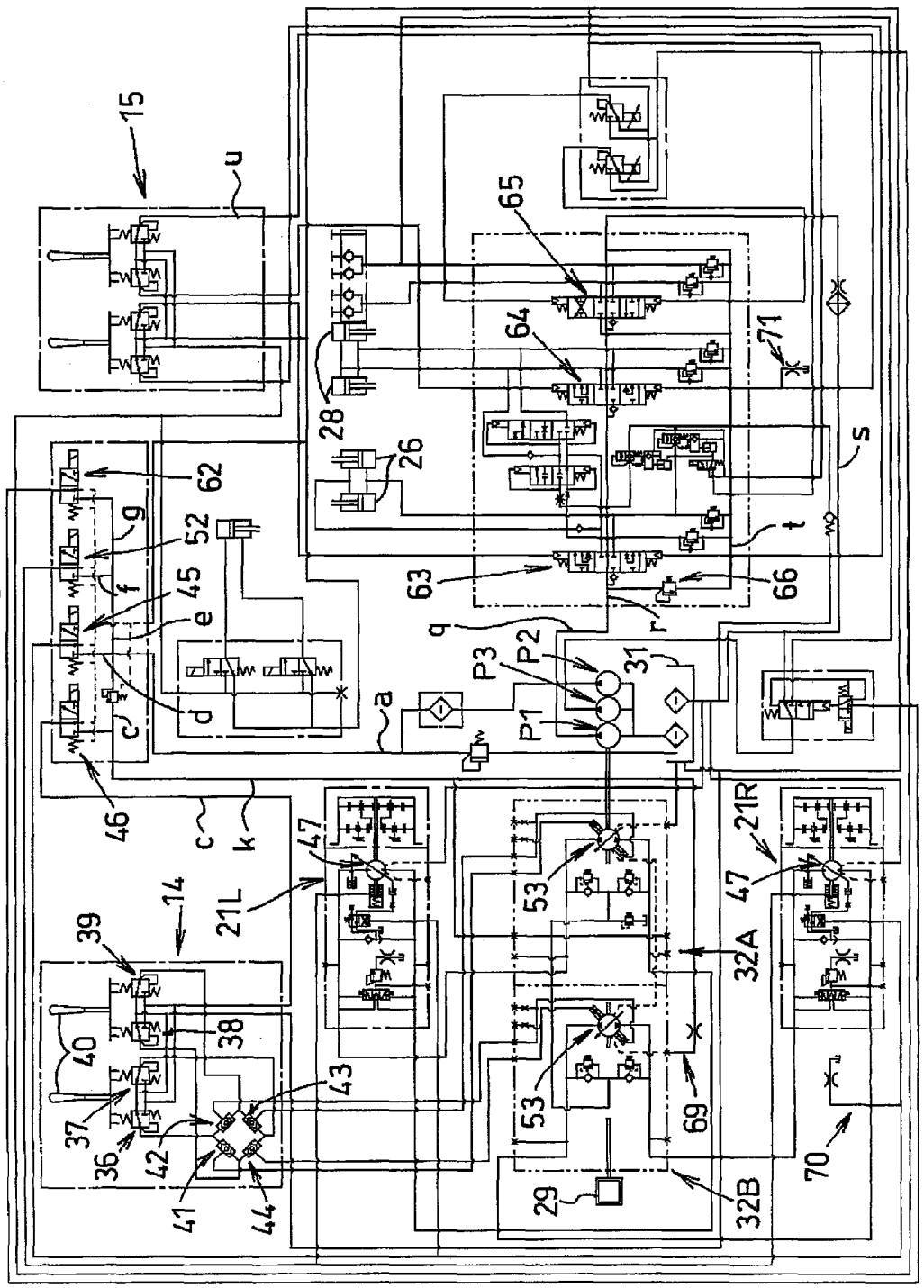
Figure 3:
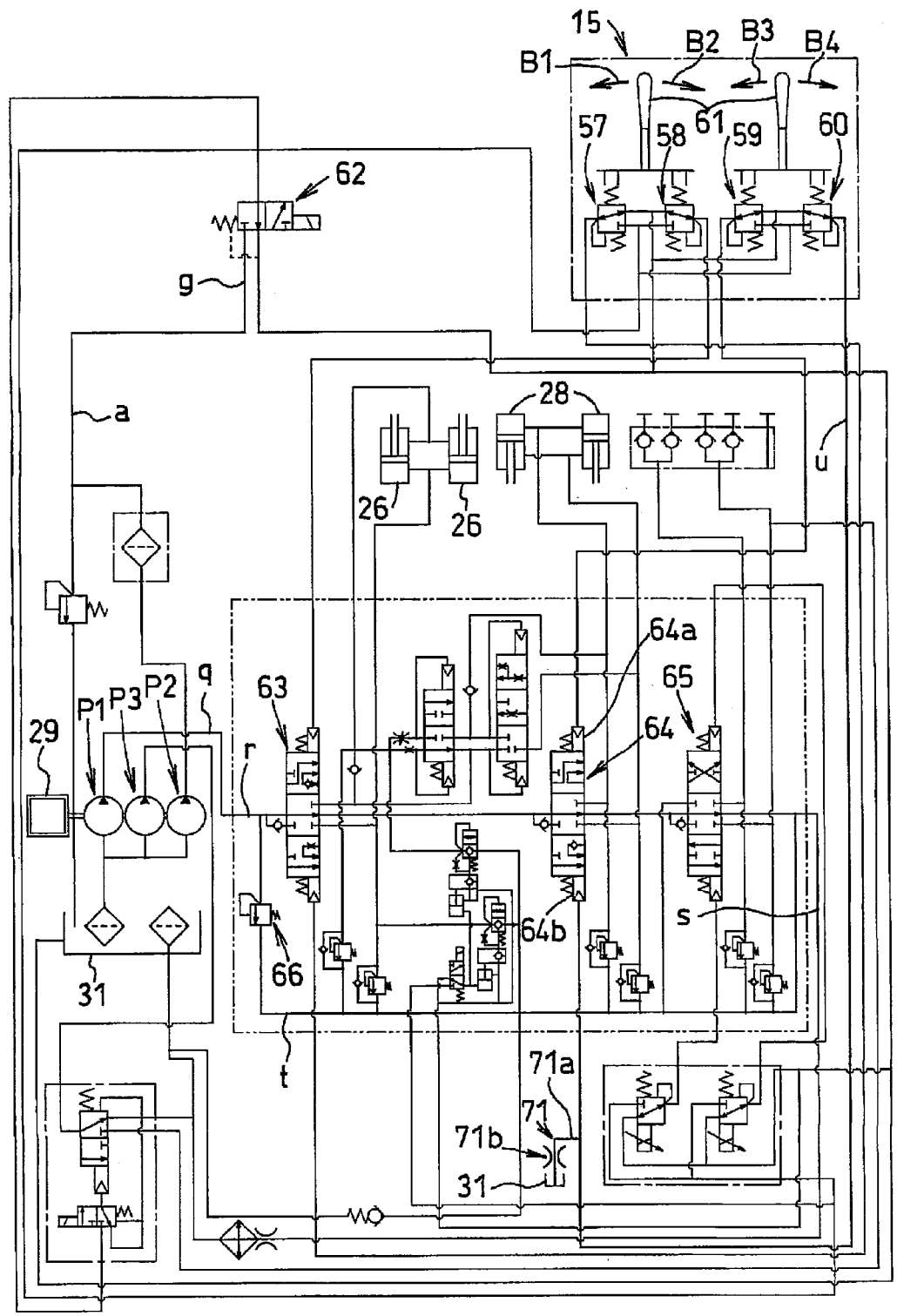

Next, with reference to FIGS. 1-3, the hydraulic system of the work machine 1 will be described.

The first through third pumps P1, P2, P3 each is comprised of a fixed displacement type gear pump driven by the power of the engine 29.

The first pump P1 (main pump) is used for driving a hydraulic actuator of an attachment attached to the leading end of the lift cylinder 26 the tilt cylinder 28 or the arm 22.

The second pump P2 (pilot pump or charge pump) is used mainly for supplying a control signal pressure (pilot pressure).

The third pump P3 (sub pump) is used for increasing a flow rate of work oil to a hydraulic actuator of a hydraulically driven attachment attached to the leading end of the arm 22 in case this hydraulic actuator requires a large capacity.

The traveling operating apparatus 14 includes a forward traveling pilot valve 36, a reverse traveling pilot valve 37, a right turning pilot valve 38, a left turning pilot valve 39, a (single) traveling lever 40 common to these pilot valves 36, 37, 38, 39 and first through fourth shuttle valves 41, 42, 43, 44.

A main supply passageway (a) for feeding discharge oil (pilot oil) of the second pump P2 is branched at a branching point (b) into a first supplying passageway (c), a second supplying passageway (d) and a third supplying passageway (e), and the third supplying passageway (e) is further branched into a fourth supplying passageway (f) and a fifth supplying passageway (g).

The pilot oil of the first supplying passageway (c) (the discharge oil from the second pump P2) can be supplied to the respective pilot valves 36, 37, 38, 39 of the traveling operating apparatus 14 with magnetic excitation of a traveling lock valve 46 comprising an electromagnetic type two-position switch valve. In response to demagnetization of this traveling lock valve 46, the pilot oil of the first supplying passageway (c) cannot be supplied to the respective pilot valves 36, 37, 38, 39 of the traveling operating apparatus 14, so that the traveling operating apparatus 14 become inoperable.

Each right/left traveling motor 21L, 21R includes an HST motor 47 comprising a swash plate, variable displacement type axial motor switchable in two, high/low speeds, a swash plate switching cylinder 48 for speed-changing the HST 47 in the two, high/low speeds by switching over the angle of the swash plate, a brake cylinder 49 for braking an output shaft 47a of the HST motor 47 (output shaft 47a each of the traveling motors 21L, 21R), a flushing valve 50, a flushing relief valve 51 and a flushing throttle 67.

The swash plate switching cylinder 48, when no pressure oil is being applied thereto, renders the HST motor 47 into the first speed condition and renders, when pressure oil is being applied thereto, the HST motor 47 into the second speed condition.

Whether to apply the pressure oil to this swash plate switching cylinder 48 or not is determined by a cylinder switching valve 68 comprising a pilot operation type two-position switching valve and this cylinder switching valve 68 can be switched over by a two-speed switching valve 45 comprising an electromagnetic type switching valve.

In more particular, when the two-speed switching valve 45 is demagnetized so that the second supplying passageway (d) is shut by this two-speed switching valve 45, no pilot pressure is applied to the cylinder switching valve 68 and also no pressure oil is applied to the swash plate switching cylinder 48, so that the HST motor 47 is under the first speed condition. And, when the two-speed switching valve 45 is excited by operating means, the two-speed switching valve 45 is switched over so as to apply the pilot pressure of the second supplying passageway (d) (the discharge oil from the second pump P2) to the cylinder switching valve 68, whereby the cylinder switching valve 68 is switched over to apply the pressure oil to the swash plate switching cylinder 48, so that the HST motor 47 is rendered into the second speed condition.

Thus, the switchover of the swash plate of the HST motor 47 is effected such that the HST motor 47 is switched over from the first speed condition to the second speed condition with utilizing the pilot oil from the second pump P2.

Incidentally, in the present embodiment, the swash plate switching cylinder 48 is configured to receive the high pressure side work oil from speed-changing oil passageways (h, i) to be described later. Instead, it may be arranged such that the swash plate switching cylinder 48 is operated directly by the pilot oil from the second pump P2.

The brake cylinder 49 brakes the output shaft 47a of the HST motor 47 with an urging force of a spring, and as a brake release valve 52 comprising an electromagnetic type two-position switching valve is magnetized, the pilot oil of the fourth supplying passageway (e) (the discharge oil from the second pump P2) is applied to this brake cylinder 49, thus releasing the braking of the output shaft 47a of the HST motor 47.

To the traveling lock valve 46 and the brake release valve 52, demagnetizing signals are transmitted simultaneously by means of e.g. a lock lever which is operated when a driver gets out of the cabin 5 and magnetizing signals are transmitted simultaneously thereto e.g. by a release switch.

The flushing valve 50 and the flushing relief valve 51 will be described later herein.

The hydraulic drive apparatus 32 includes a left traveling motor driving circuit 32A (left driving circuit) and a right traveling motor driving circuit 32B (right driving circuit). Each driving circuit 32A, 32B includes an HST pump 53 connected to the HST motor 47 of the corresponding traveling motor 21R, 21L with a pair of speed-changing oil passageways (h, i), a high pressure relief valve 54 for releasing the pressure to the low pressure side of the speed-changing oil passageways (h, i) when the pressure of the high pressure side of the speed-changing oil passageways (h, i) exceeds a predetermined pressure, and a charge circuit (j) for supplementing pressure oil from the second pump P2 to the low pressure side oil passageway (h, i) via the check valve 55.

Components of the hydraulic drive apparatus 32 are incorporated within a housing.

The charge circuit (j) can receive the oil (discharge oil from the second pump P2) of the charge pressure supplying passageway (k) branched from the first supplying passageway (c) and connected to each charge circuit (j), and the left driving circuit 32A incorporates a charge relief valve 56 for setting the circuit pressure each of the driving circuits 32A, 32B.

The second pump P2, in this embodiment, functions not only as a pilot pump for supplying pilot oil to the respective pilot valves 36, 37, 38, 39 of the traveling operating apparatus 14 and to the swash plate switching cylinder 48 and the brake cylinder 49, but also as a charge pump for supplying oil to the charge circuit (j).

The HST pump 53 each of the driving circuits 32A, 32B functions not only as a swash plate, variable displacement type axial pump driven by the power of the engine 29, but also as a pilot type hydraulic pump having a swash plate whose angle is changed by the pilot pressure, and includes a forward traveling pressure receiving portion 53a and a reverse traveling pressure receiving portion 53b to which the pilot pressure is applied. As the swash plate angle is changed by the pilot pressure applied to these pressure receiving portions 53a, 53b, a direction and an amount of work oil discharged from the HST pump 53 are changed, whereby the rotational output each of the traveling motors 21L, 21R can be speed-changed in stepless manner in the direction for moving the work machine 1 forwardly (forward rotation direction) or in the direction for moving the work machine 1 in reverse (reverse rotation direction).

The flushing valve 50 each of the traveling motors 21L, 21R is switched over by the pressure of the high pressure side of the speed-changing oil passageways (h, i) to connect the low pressure side of the speed-changing oil passageways (h, i) to the flushing relief oil passageway (m), and flushes a portion of the work oil of the low speed side oil passageway (h, i) via a flushing relief oil passageway (m) to the oil pan inside the housing each of the traveling motors 21L, 21R so as to supplement an amount of work oil to the low pressure side of the speed-changing oil passageways (h, i). Incidentally, the oil in the oil pan inside the housing each of the traveling motors 21L, 21R is returned to the work oil tank 31 via a drain circuit (n).

The flushing relief valve 51 and the flushing throttle 67 are incorporated in the flushing relief oil passageway (m) and the flushing relief valve 51 is interposed between the flushing valve 50 and the flushing throttle 67.

The HST motor 47 and the flushing valve 50, etc. each of the traveling motors 21L, 21R, the driving circuits 32A, 32B and the pair of speed-changing oil passageways (h, i) together constitute a separate type HST (hydrostatic transmission).

The traveling lever 40 of the traveling operating apparatus 14 is operable pivotally with inclination from the neutral position in the forward/reverse and right/left directions and along the oblique directions between the forward/reverse and right/left directions. As the traveling lever 40 is pivotally operated; each of the pilot valves 36, 37, 38, 39 of the traveling operating apparatus 14 becomes operable to output therefrom the pilot pressure in proportion to the pivotal amount from its neutral position of the traveling lever 40.

In more particular, as the traveling lever 40 is operated to the front side (the arrow direction A1 in FIG. 1), the forward traveling pilot valve 36 is operated so that pilot pressure is outputted from this pilot valve 36 and this pilot pressure is applied to the forward traveling pressure receiving portion 53a of the HST pump 53 of the left driving circuit 32A via the first shuttle valve 41 and applied also to the forward traveling pressure receiving portion 53a of the right driving circuit 32B via the second shuttle valve 42, whereby the output shafts 47a of the right/left traveling motors 21L, 21R are driven forwardly (forward rotation) at a speed in proportion to the pivotal amount of the traveling lever 40, so that the work machine 1 travels forward. Further, as the traveling lever 40 is operated to the rear side (the arrow direction A2 in FIG. 1), the reverse traveling pilot valve 37 is operated so that pilot pressure is outputted from this pilot valve 37 and this pilot pressure is applied to the reverse traveling pressure receiving portion 53b of the HST pump 53 of the left driving circuit 32A via the third shuttle valve 43 and applied also to the reverse traveling pressure receiving portion 53b of the HST pump 53 of the right driving circuit 32B via the fourth shuttle valve 44, whereby the output shafts 47a of the right/left traveling motors 21L, 21R are driven reversely (reverse rotation) at a speed in proportion to the pivotal amount of the traveling lever 40, so that the work machine 1 travels reverse.

Further, as the traveling lever 40 is operated to the right side (the arrow direction A3 in FIG. 1), the right turning pilot valve 38 is operated so that pilot pressure is outputted from this pilot valve 38 and this pilot pressure is applied to the forward traveling pressure receiving portion 53a of the HST pump 53 of the left driving circuit 32A via the first shuttle valve 41 and applied also to the reverse traveling pressure receiving portion 53b of the HST pump 53 of the right driving circuit 32B via the fourth shuttle valve 44, whereby the output shaft 47a of the left driving motor 21L is rotated forwardly and also the output shaft 47a of the right traveling motor 21R is rotated in reverse, so that the work machine 1 turns to the right side.

Further, as the traveling lever 40 is operated to the left side (the arrow direction A4 in FIG. 1), the left turning pilot valve 39 is operated so that pilot pressure is outputted from this pilot valve 39 and this pilot pressure is applied to the forward traveling pressure receiving portion 53a of the HST pump 53 of the right driving circuit 32B via the second shuttle valve 42 and applied also to the reverse traveling pressure receiving portion 53b of the HST pump 53 of the left driving circuit 32A via the third shuttle valve 43, whereby the output shaft 47a of the right driving motor 21R is rotated forwardly and also the output shaft 47a of the left traveling motor 21L is rotated in reverse, so that the work machine 1 turns to the left side.

Still further, as the traveling lever 40 is pivoted along the oblique direction, due to the pressure difference between the pilot pressures applied to the forward traveling pressure receiving portion 53a and the reverse traveling pressure receiving portion 53b each of the driving circuits 32A, 32B, the rotational direction and the rotational speed of the output shaft 47a each of the traveling motors 21L, 21R are determined, such that the work machine 1 will make a right turn or a left turn while traveling forwardly or in reverse. (More particularly, when the traveling lever 40 is pivoted in the forward obliquely left direction, the work machine 1 will turn left while traveling forward at the speed corresponding to the pivotal angle of the traveling lever 40. When the traveling lever 40 is pivoted in the forward obliquely right direction, the work machine 1 will turn right while traveling forward at the speed corresponding to the pivotal angle of the traveling lever 40. When the traveling lever 40 is pivoted in the reverse obliquely left direction, the work machine 1 will turn left while traveling reverse at the speed corresponding to the pivotal angle of the traveling lever 40. When the traveling lever 40 is pivoted in the reverse obliquely right direction, the work machine 1 will turn right while traveling reverse at the speed corresponding to the pivotal angle of the traveling lever 40.)

Further, the engine 29 can be accelerated by an accelerator from the idling rotational speed to a rated rotational speed. When the rotational speed of the engine 29 is increased, the rotational speed of the HST pump 53 is increased, whereby the discharge amount of this HST pump 53 is raised, and the traveling speed is increased.

To the charge pressure supplying passageway (k), there is connected a bleed circuit 69 (this will be referred to as "a first bleed circuit 69" hereinafter).

This first bleed circuit 69 includes a bleed oil passageway 69a having one end thereof connected to the charge pressure supplying passageway (k) and the other end thereof communicated to the oil pan of the housing of the hydraulic drive apparatus 32, and further includes a throttle 69b incorporated in this bleed oil passageway 69a.

The oil of the oil pan of the housing of the hydraulic drive apparatus 32 is returned to the work oil tank 31 via the drain circuit (n).

The pilot oil discharged from the second pump P2 and supplied to the traveling operating apparatus 14 via the first supplying passageway (c) is supplied also to the charge circuit (j) via the charge pressure supplying passageway (k) and a portion thereof is drained by the first bleed circuit 69 through the throttle 69b of this bleed circuit 69.

Incidentally, the oil drained via the first bleed circuit 69 could be directly returned to the work oil tank 31. However, as this oil is drained to the inside of the housing of the hydraulic drive apparatus 32 (i.e. the housing of the HST pump 53), cooling of the HST pump 53, etc. is made possible. Further, in the hydraulic system, the flushing relief valve 51 can be omitted.

Further, the other end of the bleed oil passageway 69a can be communicated to the relief oil passageway (o) for guiding the oil to be drained from the charge relief valve 56 to the oil pan of the housing of the hydraulic drive apparatus 32.

With the work machine 1 having the above-described arrangements, when e.g. the work machine 1 is advanced to plunge the bucket 23 into an amount of piled-up sand/earth or the like, a load will be applied to the HST motor 47. In this, this load applied to the HST motor 47 will be transmitted via the HST pump 53 to the engine 29, whereby the rotational speed of the engine 29 will drop.

Then, the rotational speed of the second pump P2 will decrease, thus decreasing the discharge amount of this second pump P2 and the ratio of the oil leak from the first bleed circuit 69 relative to this discharge amount of the second pump P2 will become larger. As a result, the pilot pressure outputted from the traveling operating apparatus 14 will drop speedily according to the reduction in the rotational speed of the engine 29. With this, the swash plate angle of the HST pump 53 will be automatically adjusted in a speedy manner so as to reduce the rotational speed, thus reducing the load applied to the engine 29. As a result, the stall of the engine 29 can be avoided effectively.

Figure 8:
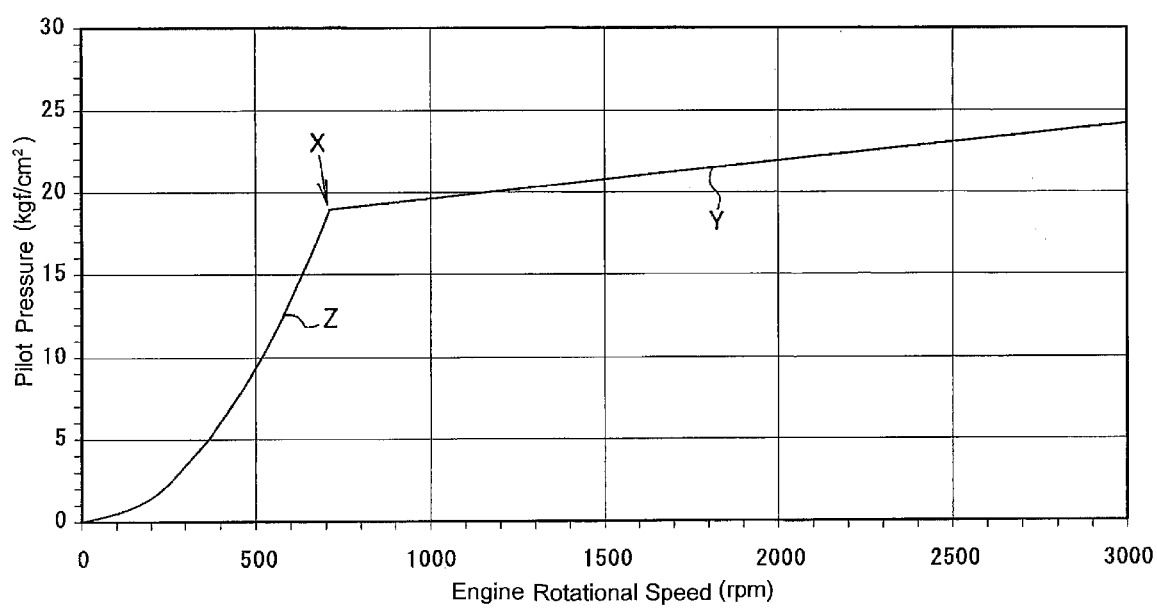
Figure 9:
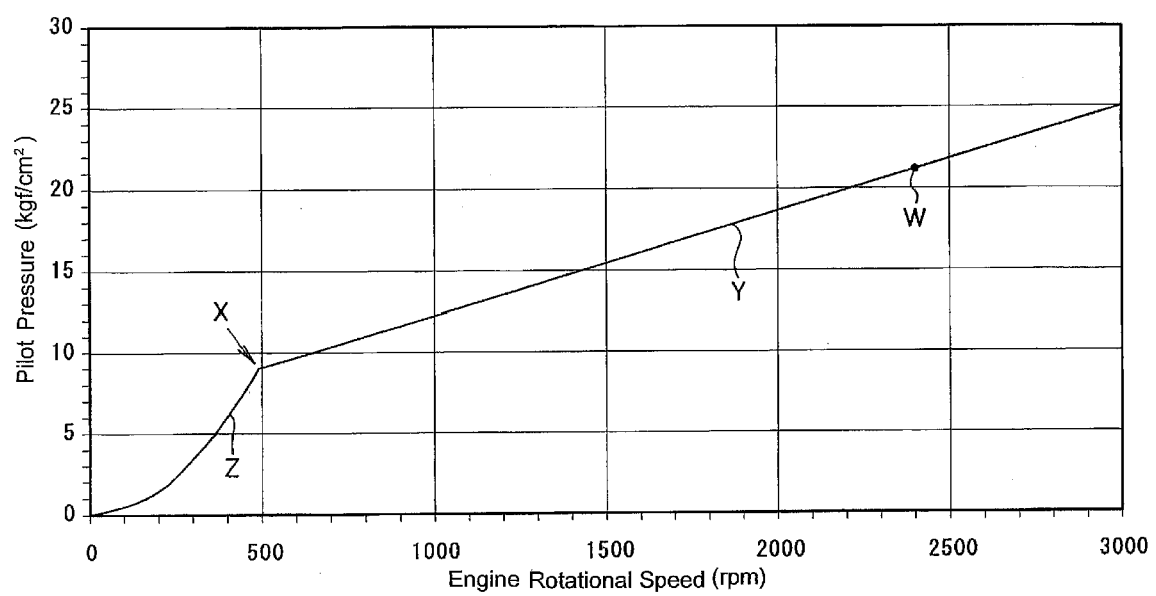
Figure 10:
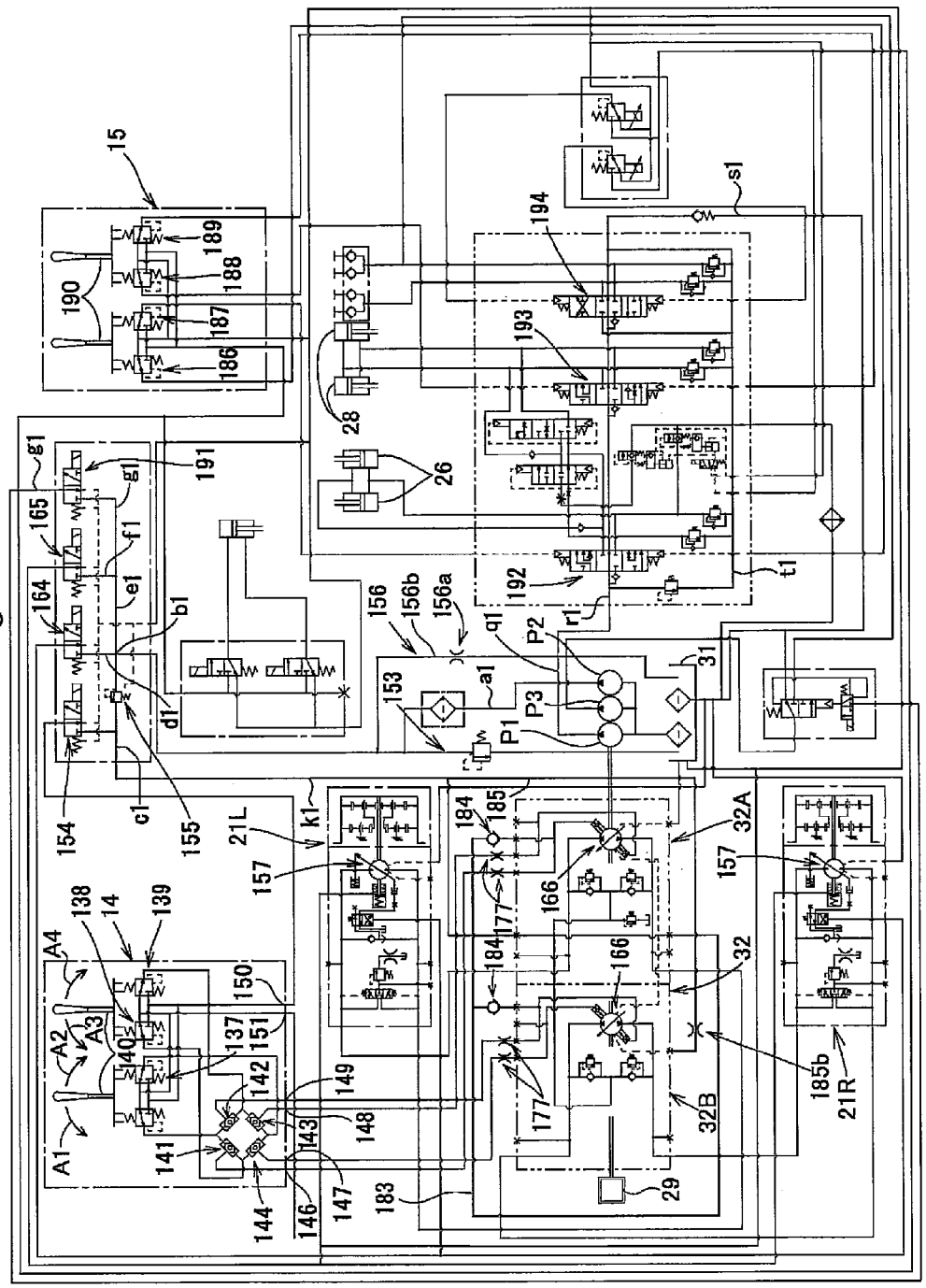
Figure 11:
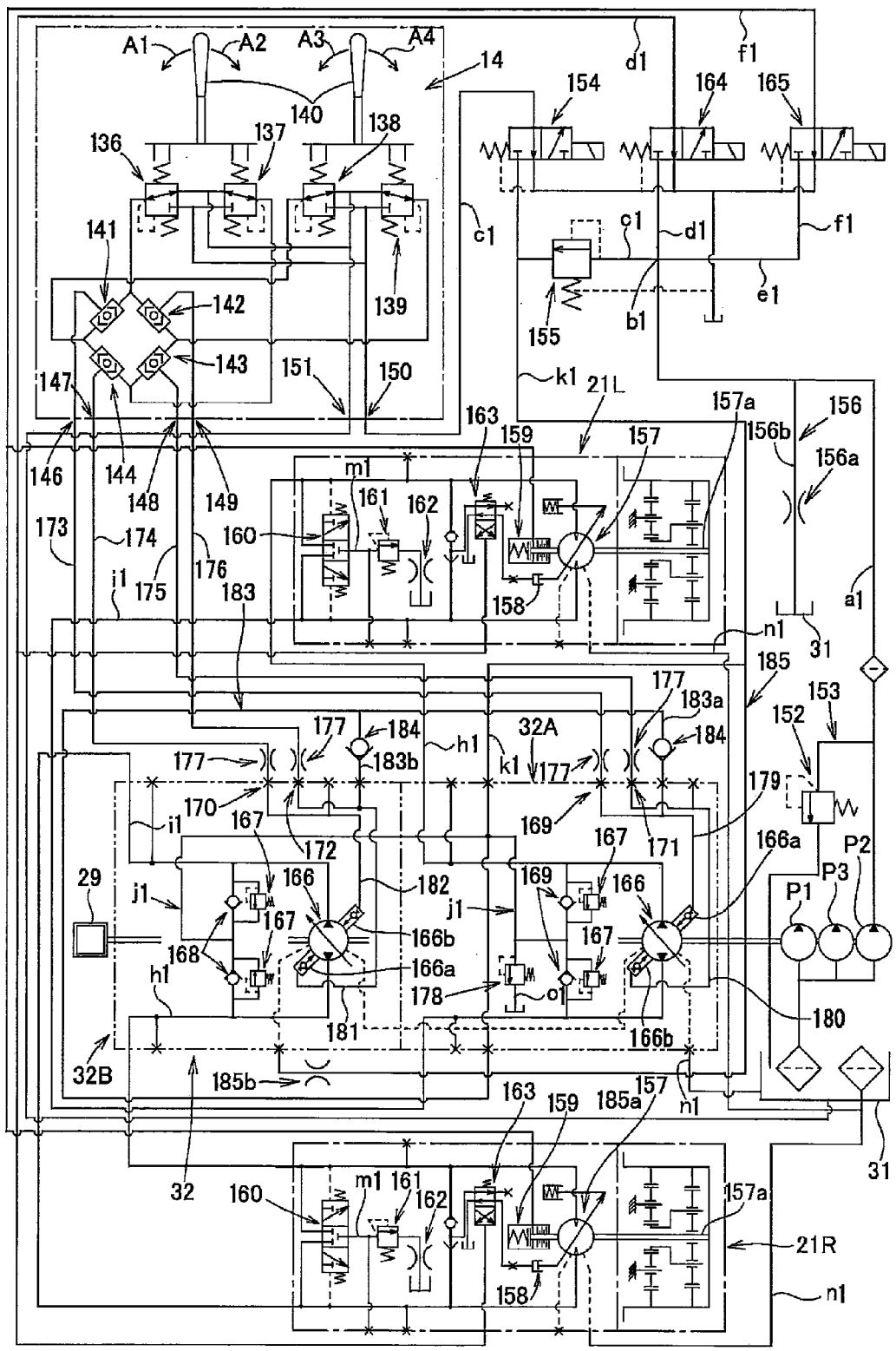
Figure 12:
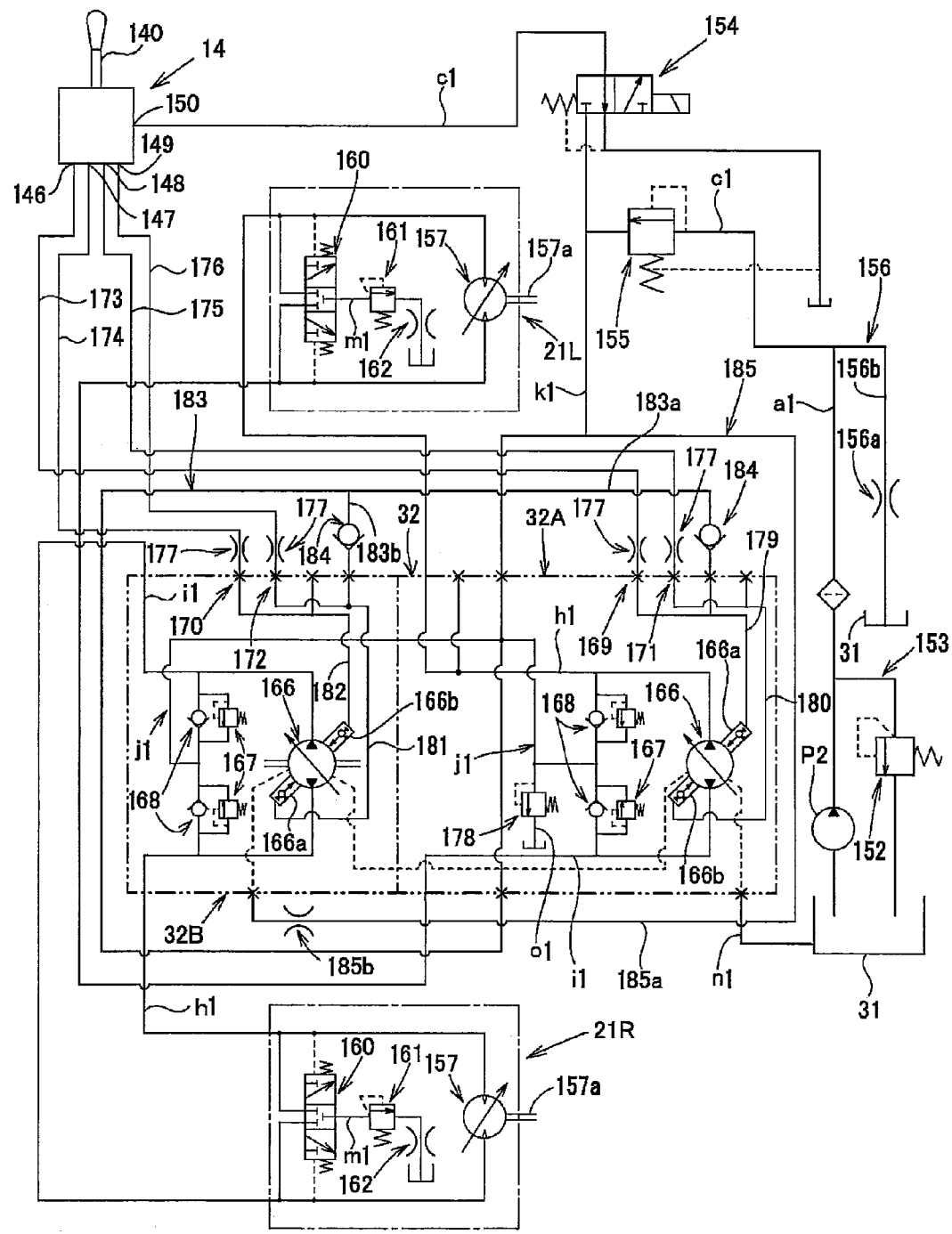
Figure 13:
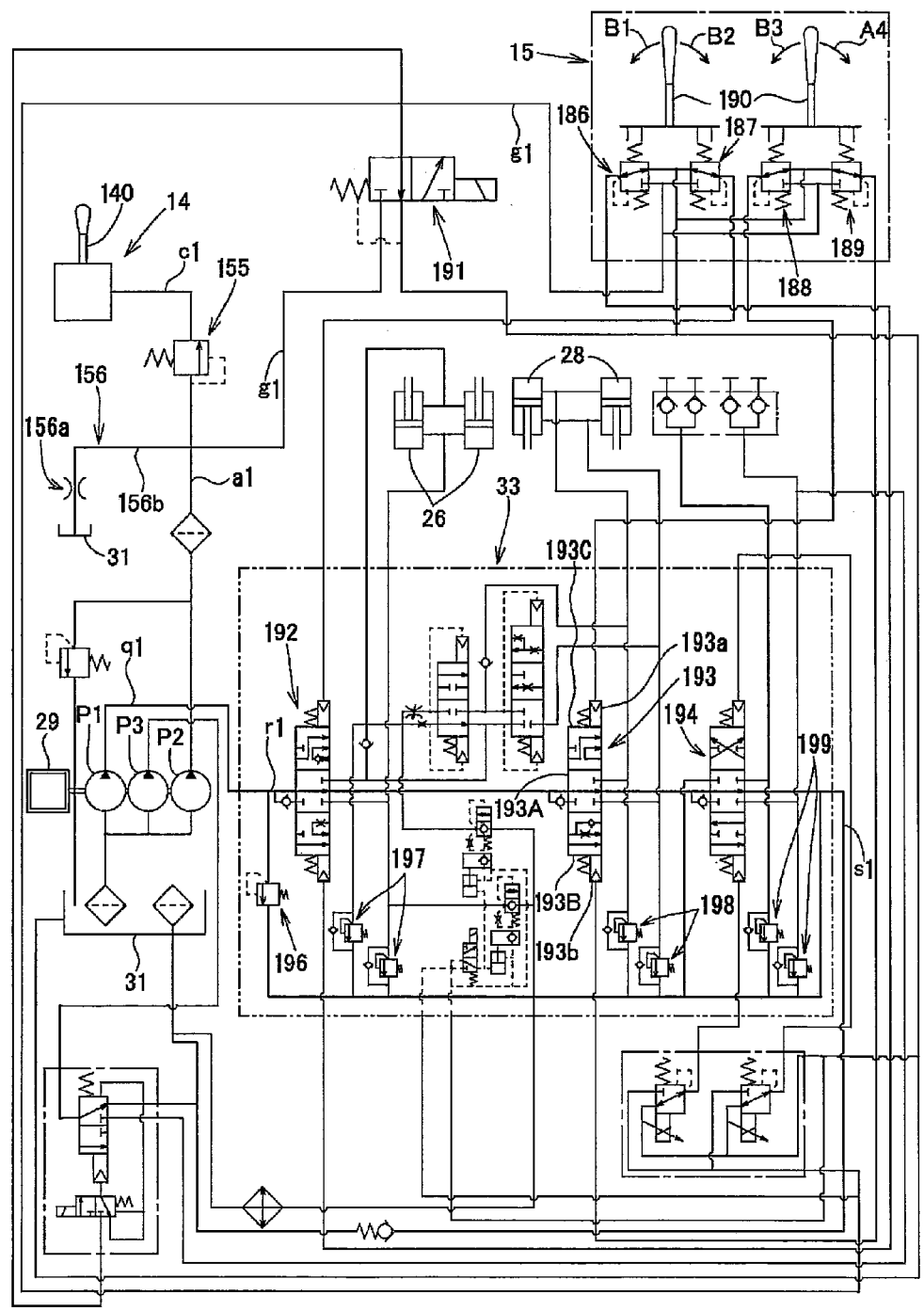
Figure 14:
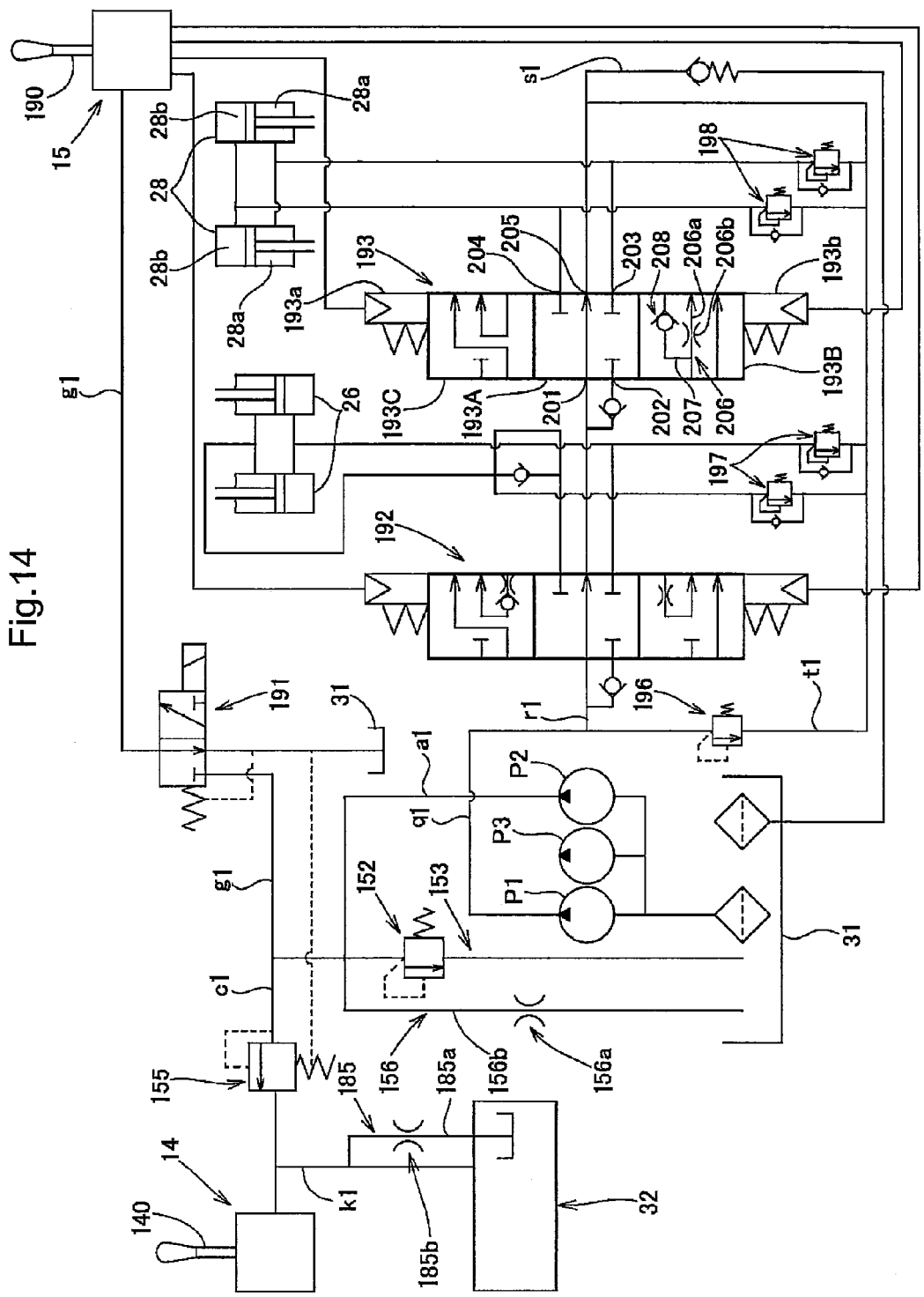

Even if the first bleed circuit 69 were not provided, as shown in FIG. 8 and FIG. 9, due to the escape of the oil from the flushing throttle 67 and the override characteristics of the charge relief valve 56 (the escape of oil from the charge relief valve 56), there could be provided the anti-stall characteristics for reducing the control pressure of the swash plate of the HST pump 53 in response to reduction in the rotational speed of the engine 29. But, the effect of such arrangement would be small.

Figure 6:
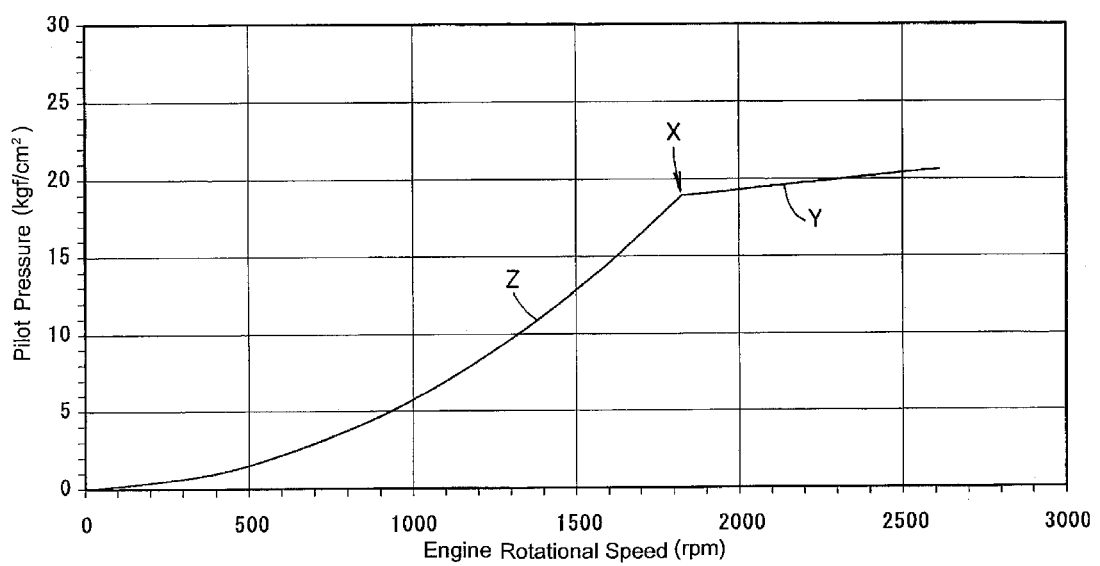
Figure 7:
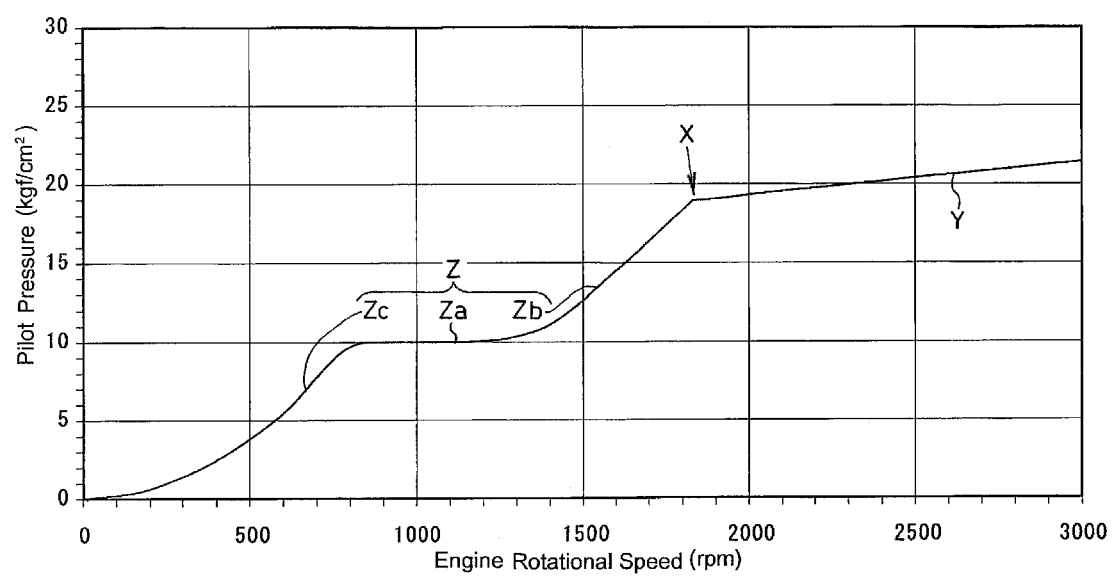

In contrast, according to the present invention, in addition to the escape of the oil from the flushing throttle 67 and the override characteristics of the charge relief valve 56, thanks to the leak of oil from the first bleed circuit 69, as shown in FIG. 6 and FIG. 7, effective anti-stall characteristics (effective anti-stall performance) can be obtained.

FIGS. 6 through 9 are graphs of the pressure characteristics curves of the anti-stall feature, the horizontal axis representing the rotational speed of the engine 29, the vertical axis representing the pilot pressure outputted from the traveling operating apparatus 14 to the HST pump 53 (control pressure for the swash plate of the HST pump 53).

Figure 1:
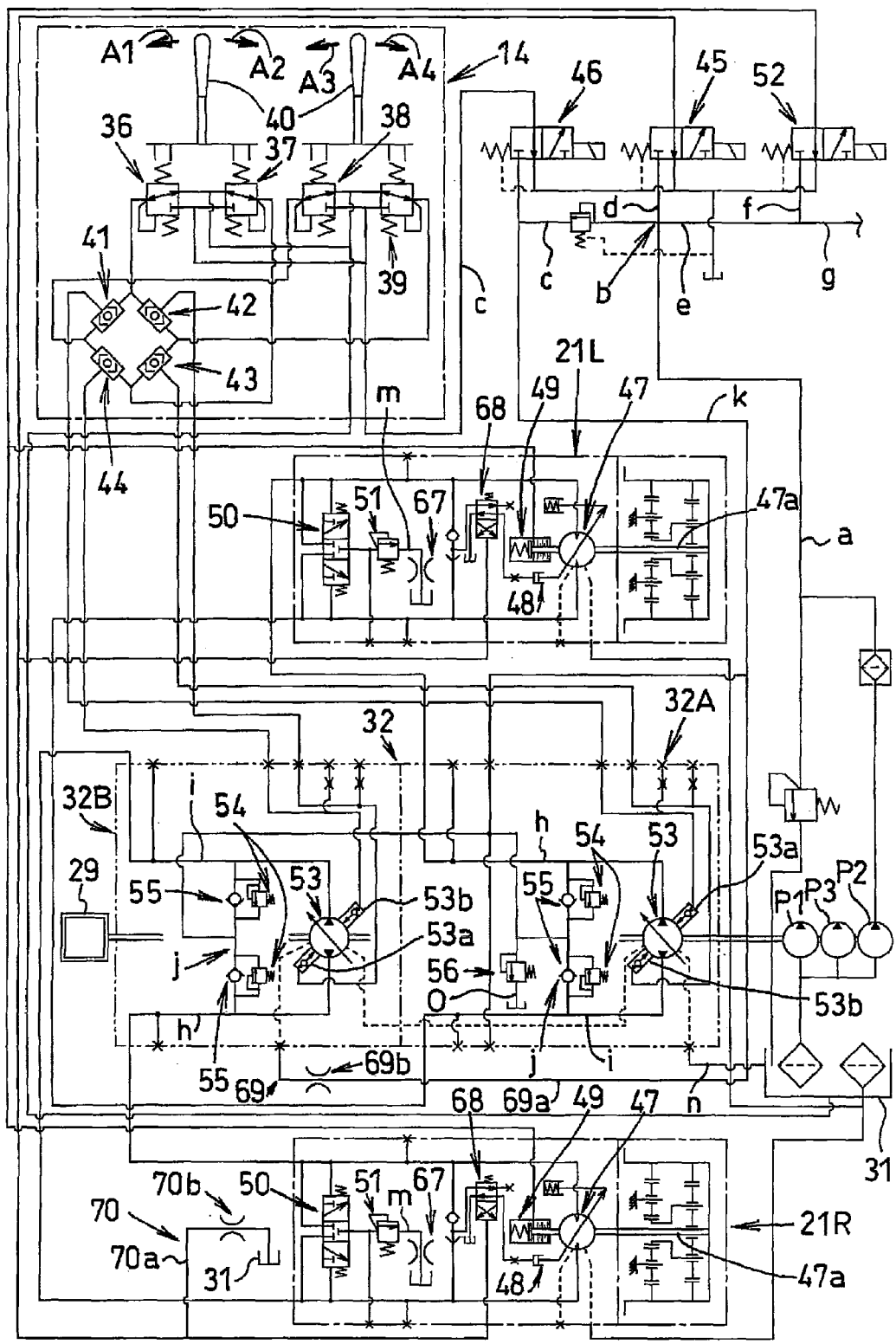

FIGS. 8 and 9 are graphs of the pressure characteristics curves of the anti-stall feature, in case in the hydraulic system shown in FIG. 1, the first bleed circuit 69 and the flushing relief valve 51 are omitted therefrom. And, FIG. 8 shows the case of using a standard charge relief valve 56, whereas FIG. 9 shows the case of using a charge relief valve 56 with an enhanced anti-stall performance.

In these FIGS. 8 and 9, a portion Y on the right side relative to a flexion point X of the pressure characteristics curve of the anti-stall feature represents the condition when the charge relief valve 56 is opened (the condition when the oil is escaped from the flushing throttle 67 and the charge relief valve 56) and a portion Z on the left side relative to the flexion point X of the pressure characteristics curve of the anti-stall feature represents the condition when the charge relief valve 56 is closed (the condition when the oil is escaped only from the flushing throttle 67).

In the cases shown in FIGS. 8 and 9, the flexion point X is located at a position of the rotational speed of the engine 29 being low, so that the right side portion Y relative to the flexion point X has a small inclination and is straight. So, the drop of the pilot pressure relative to the drop in the rotational speed from the rated rotation (2400 rpm) of the engine 29 is small. Therefore, the response of the pilot pressure to the drop in the rotational speed of the engine 29 is slow.

Further, in the case of the pressure characteristics curve depicted in FIG. 9, as compared with the pressure characteristics curve depicted in FIG. 8, the right side portion Y relative to the flexion point X has a greater inclination, but this is still far from the ideal anti-stall pressure characteristics curve. Incidentally, in the pressure characteristics curve depicted in FIG. 9, unless a certain level of pilot pressure is ensured in the rated rotation (2400 rpm) of the engine 29, control of the swash plate of the HST pump 53 at the time of high load will be impossible. Therefore, this point W cannot be lowered excessively.

FIG. 6 shows the pressure characteristics curve in case in the hydraulic system shown in FIG. 1, the flushing relief valve 51 is omitted therefrom.

In the case of the one shown in FIG. 6, a portion Y on the right side relative to a flexion point X of the pressure characteristics curve of the anti-stall feature represents the condition when the charge relief valve 56 is opened (the condition when the oil is escaped from the first bleed circuit 69, the flushing throttle 67 and the charge relief valve 56) and a portion Z on the left side relative to the flexion point X of the pressure characteristics curve of the anti-stall feature represents the condition when the charge relief valve 56 is closed (the condition when the oil is leaked from the first bleed circuit 69 and the flushing throttle 67).

In the case of the one shown in this FIG. 6 too, like the ones shown in FIGS. 8 and 9, the right side portion Y relative to the flexion point X in the pressure characteristics curve of the anti-stall has a small inclination and the left side portion Z relative to the flexion point X in the pressure characteristics curve of the anti-stall has a large inclination. Yet, in the case of the one shown in FIG. 6, as compared with the ones shown in FIGS. 8 and 9, the flexion point X is located at a position of the rotational speed of the engine 29 being higher (near 1800 rpm).

Therefore, in the case of the one shown in FIG. 6, when the rotational speed of the engine 29 drops so that the rotational speed of the engine 29 is lower than the flexion point X, there occurs a large drop in the pilot pressure relative to the drop in the rotational speed of the engine 29, so that the pilot pressure outputted from the traveling operating apparatus 14 in response to the drop in the rotational speed of the engine 29 will respond sensitively and quickly, so that the swash plate of the HST pump 53 will be returned quickly so as to decrease the rotational speed of this HST pump 53.

Further, FIG. 7 shows the pressure characteristics curve of the anti-stall in the hydraulic system depicted in FIG. 1.

In the case of the one shown in FIG. 7, the right side portion Y relative to the flexion point X in the pressure characteristics curve of the anti-stall represents the condition when the charge relief valve 56 is opened (the condition when the oil is escaped from the first bleed circuit 69, the flushing throttle 67 and the charge relief valve 56), and the left side portion Z relative to the flexion point X in the pressure characteristics curve of the anti-stall represents the condition when the charge relief valve 56 is closed. In the left side portion Z, a right side portion Zb relative to a center portion Za represents the condition when the flushing relief valve 51 is opened so that the oil is escaped from the first bleed circuit 69 and the flushing throttle 67. The center portion Za represents the condition when the flushing relief valve 51 is opened or closed so as to maintain a substantially constant pilot pressure. And, a left side portion Zc relative to the center portion Za represents the condition when the flushing relief valve 51 is completely closed, so that the oil is escaped only from the first bleed circuit 69.

In the case of the one shown in FIG. 7 too, like FIG. 6, the flexion point X is located at the position of high rotational speed of the engine 29. So, when the rotational speed of the engine 29 drops below the flexion point X, there occurs a large pressure drop in the pilot pressure in response to this drop in the rotational speed of the engine 29, and the pilot pressure outputted from the traveling operating apparatus 14 in association with the drop in the rotational speed of the engine 29 will respond sensitively, so that the swash plate of the HST pump 53 will be returned quickly so as to reduce the rotational speed of this HST pump 53. Further, in the case of the one shown in FIG. 7, arrangement is provided such that a substantially constant pressure (10 kgf/cm2) is maintained in the vicinity of the rotational speed of the engine 29 ranging from 800 rpm to 1200 rpm. This is provided because a certain level of load may be sometimes applied during the idling rotation of the engine 29 also.

For instance, in the case of straight traveling at the time of idling rotation, the swash plate of the HST pump 53 can be controlled even with a pilot pressure below 10 kgf/cm2. However, in the case of making a turn at the time of idling rotation, a certain level of load is applied, so that the swash plate of the HST pump 53 cannot be controlled unless the pilot pressure is at least 10 kgf/cm2 approximately.

Further, in the present embodiment, there is provided a second bleed circuit 70 for draining, through a throttle 70b, a portion of the pilot oil from the second pump P2 in order to switch over the HST motor 47 from the first speed condition to the second speed condition.

This second bleed circuit 70 includes a bleed oil passage 70a having one end thereof connected between the second switching valve 45 and the cylinder switching valve 68 of the second supplying passageway (k) and the other end thereof open to the work oil tank 31; and a throttle 70b incorporated in this bleed oil passageway 70a.

When the HST motor 47 is under the second speed condition and a load is applied to the engine 29, stall of the engine 29 tends to occur. So, providing the first bleed circuit 69 alone may not be sufficient to prevent this. However, with the provision of the second bleed circuit 70, when the HST motor 47 is under the second speed condition and the work machine 1 is advanced to plunge the bucket 23 into piled sand/earth, due to the leak of the pilot oil from the second bleed circuit 70 in addition to the leak of the pilot oil from the first bleed circuit 69, the pilot pressure outputted from the traveling operating apparatus 14 is dropped quickly, thus preventing stall of the engine 29.

The implement operating apparatus 15 includes an arm elevating pilot valve 57, an arm lowering pilot valve 58, a bucket dumping pilot valve 59, a bucket scooping pilot valve 60 and an operating lever (single lever) 61 common to these pilot valves 57, 58, 59, 60.

To each pilot valve 57, 58, 59, 60 of the implement operating apparatus 15, pilot oil of the fifth supplying passageway (g) (from the second pump P2) can be supplied, in response to magnetic excitation of an implement lock valve 62 comprising an electromagnetic two-position switching valve; and in response to demagnetization of the implement lock valve 62, supplying of the pressure oil from the second pump P2 becomes disabled, so that the implement operating apparatus 15 become inoperable.

The implement lock valve 62, like the traveling lock valve 46 and the brake releasing valve 52, receives a demagnetizing signal by the lock lever operable at the time of driver's getting of the machine and receives a magnetizing signal by a release switch.

The implement control valve 33 includes an arm control valve 63 for controlling the lift cylinder 26, a bucket control valve 64 for controlling the tilt cylinder 28, and an auxiliary control valve 65 (this will be referred to as "SP control valve") for controlling a hydraulic actuator of the attachment attached to e.g. the leading end of the arm 22. Each one of the control valves 63, 64, 65 is comprised of a pilot operation type straight moving spool-shaped, three-position switching valve.

The arm control valve 63, the bucket control valve 64 and the SP control valve 65 are incorporated in an implement supplying oil passageway (r) connected to a discharge passageway (q) of the first pump P1, in the order of the arm control valve 63, the bucket control valve 64 and the SP control valve 65 from the upstream side. In operation, the work oil from the first pump P1 can be supplied to the lift cylinder 26 via the arm control valve 63, or to the tilt cylinder 28 via the bucket control valve 64, or to the hydraulic actuator of the attachment via the SP control valve 65.

The implement supplying passageway (r) extends through the SP control valve 65 and then is connected to the drain oil passageway (s).

In the implement supplying passageway (r), on the upstream side of the arm control valve 63, one end of a bypass oil passageway (t) is connected. And, the other end of this bypass oil passageway (t) is connected to the implement supplying oil passageway (r) more downstream than the SP control valve 65 and the bypass oil passageway (t) incorporates a relief valve 66 for setting the circuit pressure of this implement supplying oil passageway (r).

The operating lever 61 of the implement operating apparatus 15 is operable pivotally with inclination from the neutral position in the forward/reverse and right/left directions and along the oblique directions between the forward/reverse and right/left directions. As the operating lever 61 is pivotally operated, each pilot valve 57, 58, 59, 60 of the implement operating apparatus 15 is operated and also a pilot pressure in proportion to the operational amount of the operating lever 61 from the neutral position is outputted from the operated pilot valve 57, 58, 59, 60.

Further, when the operating lever 61 is pivoted rearward (the direction of arrow B1 in FIG. 3), the arm elevating pilot valve 57 is operated and a pilot pressure is outputted from this arm elevating pilot valve 57. This pilot pressure is applied to one pressure receiving portion of the arm control valve 63, whereby this control valve 63 is operated, and the lift cylinder 26 is expanded and the arm 22 is elevated at the speed proportional to the pivoted amount of the operating lever 61.

When As the operating lever 61 is pivoted forward (the direction of arrow B2 in FIG. 3), the arm lowering pilot valve 58 is operated and a pilot pressure is outputted from this arm lowering pilot valve 58. This pilot pressure is applied to the other pressure receiving portion of the arm control valve 63, whereby this control valve 63 is operated, and the lift cylinder 26 is contracted and the arm 22 is lowered at the speed proportional to the pivoted amount of the operating lever 61.

When the operating lever 61 is pivoted to the right (the direction of arrow B3 in FIG. 3), the bucket dumping pilot valve 59 is operated and a pilot pressure is outputted from this pilot valve 59. This pilot pressure is applied to the dumping side pressure receiving portion 64a of the buck control valve 64, whereby this control valve 64 is operated, and the tilt cylinder 28 is expanded and the bucket 23 effects a dumping action at the speed proportional to the pivoted amount of the operating lever 61.

When the operating lever 61 is pivoted to the left (the direction of arrow B4 in FIG. 3), the bucket scooping pilot valve 60 is operated and a pilot pressure is outputted from this pilot valve 60. This pilot pressure is applied to the scooping side pressure receiving portion 64b of the buck control valve 64, whereby this control valve 64 is operated, and the tilt cylinder 28 is contracted and the bucket 23 effects a scooping action at the speed proportional to the pivoted amount of the operating lever 61.

Further, when the operating lever 61 is pivoted in the oblique direction, composite actions of the elevating/lowering action of the arm 22 and the scooping/dumping action is made possible.

Further, in the hydraulic system of this embodiment, there is provided a third bleed circuit 71 for draining, via a throttle 71b, a portion of the pilot oil from the second pump P2 supplied to the scooping side pressure receiving portion 64b of the pilot control valve 61.

This third bleed circuit 71 includes a bleed oil passageway 71a having one end thereof connected to a scooping side pilot oil passageway (u) connecting the bucket scooping pilot valve 60 and the scooping side pressure receiving portion 64b of the bucket control valve 64, and the other end thereof open to the work oil tank 31; and a throttle 71b incorporated in this bleed oil passageway 71a.

When the work machine 1 is advanced to plunge the bucket 23 into piled sand/earth and the bucket 23 is caused to effect a scooping action, providing the first bleed circuit 69 alone may be insufficient to cope with this. However, with further provision of the third bleed circuit 71, when the work machine 1 is advanced to plunge the bucket 23 into piled sand/earth and the bucket 23 is caused to effect a scooping action, due to the leak of pilot oil from the third bleed circuit 71 in addition to the leak of pilot oil from the first bleed circuit 69, the pilot pressure outputted from the traveling operating apparatus 14 will drop quickly, thus preventing stall of the engine 29.

Second Embodiment

Next, with reference to FIGS. 10-15, a second embodiment will be described. The hydraulic system relating to this embodiment is also applicable to a truck loader (work machine) 1 shown in FIGS. 4-5.

In the hydraulic system of the work machine 1 shown in FIGS. 10-14, the first through third pumps P1, P2, P3 each is comprised of a fixed displacement type gear pump driven by the power of the engine 29.

The first pump P1 (main pump) is used for driving a hydraulic actuator of an attachment attached to the leading end of the lift cylinder 26, the bucket cylinder 28 or the arm 22.

The second pump P2 (pilot pump or charge pump) is used mainly for supplying a control signal pressure (pilot pressure).

The third pump P3 (sub pump) is used for increasing a flow rate of work oil supplied to a hydraulic actuator of a hydraulically driven attachment attached to the leading end of the arm 22 in case this hydraulic actuator requires a large capacity.

The traveling operating apparatus 14 includes a forward traveling pilot valve 136, a reverse traveling pilot valve 137, a right turning pilot valve 138, a left turning pilot valve 139, a (single) traveling lever 140 common to these pilot valves 136, 137, 138, 139 and first through fourth shuttle valves 141, 142, 143, 144.

The traveling operating apparatus 14 includes first through fourth output ports 146, 147, 148, 149, a pump port 150 for receiving oil from the second pump P2, and a tank port 151 communicated with the work oil tank 31.

To the second pump P2, there is connected a main supply passageway (a1) for flowing the discharge oil (pilot oil) discharged from this second pump P2. To this main supplying passageway (a), there is connected a relief circuit 153 including a relief valve 152.

The main supply passageway (a1) is branched at a branching point (b1) into a first supplying passageway (c1), a second supplying passageway (d1) and a third supplying passageway (e1), and the third supplying passageway (e1) is further branched into a fourth supplying passageway (f1) and a fifth supplying passageway (g1).

The first supplying passageway (c1) is connected to a pump port 150 of the traveling operating apparatus 14, so that the discharge oil from the second pump P2 is supplied as pilot oil to the traveling operating apparatus 14 and this pilot oil supplied to the traveling operating apparatus 14 can be supplied to each of the pilot valves 136, 137, 138, 139 of the traveling operating apparatus 14, and unused pilot oil is drained from a tank port 151.

The first supplying passageway (c1) includes a traveling lock valve 154 comprising an electromagnetic type two-position switch valve and a pressure compensating valve 155 located between this traveling lock valve 154 and the branching point (b1).

The pilot oil flowing in the first supplying passageway (c1) can be supplied to the traveling operating apparatus 14 with magnetic excitation of the traveling lock valve 154. When this traveling lock valve 154 is demagnetized, the pilot oil of the first supplying oil passageway (c) cannot be supplied to the traveling operating apparatus 14, so that the traveling operating apparatus 14 becomes inoperable.

The pressure compensating valve 155 maintains the primary pressure of this pressure compensating valve 155 and the pressures of the second through fifth supplying passageways (d1-g1) at predetermined pressures (e.g. 30 kgf/cm2).

The hydraulic system of this work machine 1 includes a bleed circuit 156 (this will be referred to as the "main bleed circuit") for draining a portion of the discharge oil from the second pump P2 through a throttle 156a.

This main bleed circuit 156 is provided for draining a portion of the pressure oil on the upstream side of the pressure compensating valve 155, and includes a bleed oil passageway 156b having one end thereof connected to the oil passageway upstream of the pressure compensating valve 155 and the relief valve 152 and the other end thereof communicated to the work oil tank 31, and the throttle 156a incorporated in this bleed oil passageway 156b.

The diameter of the throttle 156a of this main bleed circuit 156 is sized sufficient to maintain the primary pressure of the pressure compensating valve 155 and the pressures of the second through fifth supplying passageways (d1-g1) at predetermined pressures (e.g. 30 kgf/cm2), even when the engine 29 is under idling rotation (about 1050 rpm), and sized also to allow the primary pressure of this pressure compensating valve 155 and the pressures of the second through fifth supplying passageways (d1-g1) to drop to an approximately half of the set pressure of the pressure compensating valve 155 (e.g. about 15 kgf/cm2).

Each of the right/left traveling motors 21L, 21R includes an HST motor 157 comprising a swash plate, variable displacement type axial motor switchable in two, high/low speeds, a swash plate switching cylinder 158 for speed-changing the HST motor 157 between the two, high/low speeds by switching over the angle of the swash plate, a brake cylinder 159 for braking an output shaft 157a of the HST motor 157 (output shaft 157a each of the traveling motors 21L, 21R), a flushing valve 160, a flushing relief valve 161 and a flushing throttle 162.

The swash plate switching cylinder 158, when no pressure oil is being applied thereto, renders the HST motor 157 into the first speed condition and renders, when pressure oil is being applied thereto, the HST motor 157 into the second speed condition.

Whether to apply the pressure oil to this swash plate switching cylinder 158 or not is determined by the cylinder switching valve 163 comprising a pilot operation type two-position switching valve and this cylinder switching valve 163 can be switched over by a two-speed switching valve 164 comprising an electromagnetic type, two-position switching valve.

In more particular, when the two-speed switching valve 164 is demagnetized so that the second supplying passageway (d1) is shut by this two-speed switching valve 164, no pilot pressure is applied to the cylinder switching valve 163 and also no pressure oil is applied to the swash plate switching cylinder 158, so that the HST motor 157 is under the first speed condition. And, when the two-speed switching valve 164 is excited by operating means, the two-speed switching valve 164 is switched over so as to apply the pilot pressure of the second supplying passageway (d1) (the discharge oil from the second pump P2) to the cylinder switching valve 163, whereby the cylinder switching valve 163 is switched over to apply the pressure oil to the swash plate switching cylinder 158, so that the HST motor 157 is rendered into the second speed condition.

The brake cylinder 159 brakes the output shaft 157a of the HST motor 157 with an urging force of a spring, and as a brake release valve 165 comprising an electromagnetic type two-position switching valve is magnetized, the pilot oil of the fourth supplying passageway (f1) (the discharge oil from the second pump P2) is applied to this brake cylinder 159, thus releasing the braking of the output shaft 157a of the HST motor 157.

To the traveling lock valve 154 and the brake release valve 165, demagnetizing signals are transmitted simultaneously by means of e.g. a lock lever which is operated when a driver gets out of the cabin 5 and magnetizing signals are transmitted simultaneously thereto by a release switch.

The flushing valve 160 and the flushing relief valve 161 will be described later herein.

The hydraulic drive apparatus 32 includes a left traveling motor driving circuit 32A (left driving circuit) for the left traveling motor 21L and a right traveling motor driving circuit 32B (right driving circuit) for the right traveling motor 21R. Each driving circuit 32A, 32B includes an HST pump (traveling hydraulic pump) 166 connected to the HST motor 157 of the traveling motor 21R or 21L corresponding thereto via a pair of speed-changing oil passageways (h1, i1); a high pressure relief valve 167 for releasing the pressure to the low pressure side of the speed-changing oil passageways (h1, i1) when the pressure of the high pressure side of the speed-changing oil passageways (h1, i1) exceeds a predetermined pressure; and a charge circuit (j1) for supplementing pressure oil from the second pump P2 to the low pressure side oil passageway (h1, i1) via the check valve 168.

The components of the hydraulic drive apparatus 32 are incorporated within a housing.

The hydraulic drive apparatus 32 includes first through fourth input ports 169-172 for inputting the pilot oil from the traveling operating apparatus 14.

The first input port 169 is connected via a first output oil passageway 173 to the first output port 146 of the traveling operating apparatus 14. The second input port 170 is connected via a second output oil passageway 174 to the second output port 147 of the traveling operating apparatus 14. The third input port 171 is connected via a third output oil passageway 175 to the third output port 148 of the traveling operating apparatus 14. The fourth output port 172 is connected via a fourth output oil passageway 176 to the fourth output port 149 of the traveling operating apparatus 14.

Each one of the first through fourth output oil passageways 173-156 includes a shock relieving throttle 177.

The charge circuit (j1) can receive the oil of the charge pressure supplying passageway (k1) (discharge oil from the second pump P2 and the primary pilot oil of the traveling operating apparatus 14) branched from the first supplying passageway (c1) and connected to each charge circuit 61).

The charge pressure supplying passageway (k1) is branched from the first supplying passageway (c) on the downstream side of the pressure compensating valve 155 and on the upstream side of the traveling lock valve 154, and is connected to the charge circuit (j1).

Further, the left driving circuit 32A incorporates a charge relief valve 178 for setting the pressure of the charge circuit (j1) each of the driving circuits 32A, 32B.

The second pump P2, in this embodiment, functions not only as a pilot pump for supplying pilot oil to the pilot valves 136, 137, 138, 139 of the traveling operating apparatus 14 and to the cylinder switching cylinder 163 and the brake cylinder 159, but also as a charge pump for supplying oil to the charge circuit (j1).

The HST pump 166 each of the driving circuits 32A, 32B functions not only as a swash plate variable displacement type axial pup driven by the power of the engine 29, but also as a pilot type hydraulic pump having a swash plate whose angle is changed by the pilot pressure (swash plate, variable displacement hydraulic pump).

In more particular, the HST pump 166 includes a forward traveling pressure receiving portion 166a and a reverse traveling pressure receiving portion 166b to which the pilot pressure is applied. As the swash plate angle is changed by the pilot pressure applied to these pressure receiving portions 166a, 166b, a direction and an amount of work oil discharged from the HST pump 166 are changed, whereby the rotational output each of the traveling motors 21L, 21R can be speed-changed in stepless manner in the direction for moving the work machine 1 forwardly (forward rotation direction) or in the direction for moving the work machine 1 in reverse (reverse rotation direction).

The forward traveling pressure receiving portion 166a of the HST pump 166 of the left driving circuit 32A is connected to the first input port 169 via a first connecting oil passageway 179, and the reverse traveling pressure receiving portion 166b of the HST pump 166 is connected to the third input port 171 via a second connecting oil passageway 180.

The forward traveling pressure receiving portion 166a of the HST pump 166 of the right driving circuit 32B is connected to the fourth input port 172 via a third connecting oil passageway 181 and the reverse traveling pressure receiving portion 166b of the HST pump 166 is connected to the second input port 170 via a fourth connecting oil passageway 182.

The first connecting oil passageway 179 and the third connecting oil passageway 181 are communicated to the charge pressure supplying passageway (k1) (the primary side oil passageway of the traveling operating apparatus 14) via an escape oil passageway 182.

This escape oil passageway 183 has its one end connected to the charge pressure supplying passageway (k1).

Further, the other end of the escape oil passageway 183 is branched into a first branch passageway 183a and a second branch passageway 183b, and the first branch passageway 183a is connected to the first connecting oil passageway 179 and the second branch passageway 183b is connected to the third connecting oil passageway 181. And, the other end of the escape oil passageway 183 is communicated to the forward traveling pressure receiving portion 166a of the HST pump 166.

The first branch passageway 183a and the second branch passageway 183b each incorporates a check valve 184.

This check valve 184 is closed when the primary pressure of the traveling operating apparatus 14 is greater than the pressure of the forward traveling pressure receiving portion 166a, thus preventing communication of pressure oil from the charge pressure supplying passageway (k1) to the first and third connecting oil passageways 179, 181. And, this valve 184 is opened when the primary pressure of the traveling operating apparatus 14 is smaller than the pressure of the forward traveling pressure receiving portion 166a, thus allowing communication of pressure oil from the first and third connecting oil passageways 179, 181 to the charge pressure supplying passageway (k1).

Incidentally, the other end of the escape oil passageway 183 may be connected to the hydraulic passageway between the shock relieving throttle 177 and the forward traveling pressure receiving portion 166a.

The flushing valve 160 each of the traveling motors 21L, 21R is switched over by the pressure of the high pressure side of the speed-changing oil passageways (h1, i1) to connect the low pressure side of the speed-changing oil passageways (h1, i1) to the flushing relief oil passageway (m1), and flushes a portion of the work oil of the low speed side oil passageway (h1, i1) via a flushing relief oil passageway (m1) to the oil pan inside the housing each of the traveling motors 21L, 21R so as to supplement an amount of work oil to the low pressure side of the speed-changing oil passageways (h1, i1). Incidentally, the oil in the oil pan inside the housing each of the traveling motors 21L, 21R is returned to the work oil tank 31 via a drain circuit (n1).

The flushing relief valve 161 and the flushing throttle 162 are incorporated in the flushing relief oil passageway (m1) and the flushing relief valve 161 is interposed between the flushing valve 160 and the flushing throttle 162.

The HST motor 157 and the flushing valve 160, etc. each of the traveling motors 21L, 21R, the driving circuits 32A, 32B and the pair of speed-changing oil passageways (h1, i1) together constitute a separate type HST (hydrostatic transmission).

A traveling lever 140 of the traveling operating apparatus 14 is operable pivotally with inclination from the neutral position in the forward/reverse and right/left directions and along the oblique directions between the forward/reverse and right/left directions. As the traveling lever 140 is pivotally operated, each pilot valve 136, 137, 138, 139 of the traveling operating apparatus 14 is operated and a pilot pressure proportional to the operated amount of the traveling lever 140 from the neutral position is outputted from the operated pilot valve 136, 137, 138, 139.

As the traveling lever 140 is operated to the front side (the arrow direction A1 in FIG. 11), the forward traveling pilot valve 136 is operated so that pilot pressure is outputted from this pilot valve 136, and this pilot pressure is applied to the forward traveling pressure receiving portion 166a of the HST pump 166 of the left driving circuit 32A via the first shuttle valve 141 and applied also to the forward traveling pressure receiving portion 166a of the right driving circuit 32B via the second shuttle valve 142, whereby the output shafts 157a of the right/left traveling motors 21L, 21R are driven forwardly (forward rotation) at a speed in proportion to the pivotal amount of the traveling lever 140, so that the work machine 1 travels forward.

Further, as the traveling lever 140 is operated to the rear side (the arrow direction A2 in FIG. 11), the reverse traveling pilot valve 137 is operated so that pilot pressure is outputted from this pilot valve 137, and this pilot pressure is applied to the reverse traveling pressure receiving portion 166b of the HST pump 166 of the left driving circuit 32A via the third shuttle valve 143 and applied also to the reverse traveling pressure receiving portion 166b of the HST pump 166 of the right driving circuit 32B via the fourth shuttle valve 144, whereby the output shafts 157a of the right/left traveling motors 21L, 21R are driven reversely (reverse rotation) at a speed in proportion to the pivotal amount of the traveling lever 140, so that the work machine 1 travels reverse.

Further, as the traveling lever 140 is operated to the right side (the arrow direction A3 in FIG. 11), the right turning pilot valve 138 is operated so that pilot pressure is outputted from this pilot valve 138, and this pilot pressure is applied to the forward traveling pressure receiving portion 166a of the HST pump 166 of the left driving circuit 32A via the first shuttle valve 141 and applied also to the reverse traveling pressure receiving portion 166b of the HST pump 166 of the right driving circuit 32B via the fourth shuttle valve 144, whereby the output shaft 157a of the left driving motor 21L is rotated forwardly and also the output shaft 157a of the right traveling motor 21R is rotated in reverse, so that the work machine 1 turns to the right side.

Further, as the traveling lever 140 is operated to the left side (the arrow direction A4 in FIG. 11), the left turning pilot valve 139 is operated so that pilot pressure is outputted from this pilot valve 139, and this pilot pressure is applied to the forward traveling pressure receiving portion 166a of the HST pump 166 of the right driving circuit 32B via the second shuttle valve 142 and applied also to the reverse traveling pressure receiving portion 166b of the HST pump 166 of the left driving circuit 32A via the third shuttle valve 143, whereby the output shaft 157a of the right driving motor 21R is rotated forwardly and also the output shaft 157a of the left traveling motor 21L is rotated in reverse, so that the work machine 1 turns to the left side.

Still further, as the traveling lever 140 is pivoted along the oblique direction, due to the pressure difference between the pilot pressures applied to the forward traveling pressure receiving portion 166a and the reverse traveling pressure receiving portion 166b each of the driving circuits 32A, 32B, the rotational direction and the rotational speed of the output shaft 157a each of the traveling motors 21L, 21R are determined, such that the work machine 1 will make a right turn or a left turn while traveling forwardly or in reverse. (More particularly, when the traveling lever 140 is pivoted in the forward obliquely left direction, the work machine 1 will turn left while traveling forward at the speed corresponding to the pivotal angle of the traveling lever 140. When the traveling lever 140 is pivoted in the forward obliquely right direction, the work machine 1 will turn right while traveling forward at the speed corresponding to the pivotal angle of the traveling lever 140. When the traveling lever 140 is pivoted in the reverse obliquely left direction, the work machine 1 will turn left while traveling reverse at the speed corresponding to the pivotal angle of the traveling lever 140. When the traveling lever 140 is pivoted in the reverse obliquely right direction, the work machine 1 will turn right while traveling reverse at the speed corresponding to the pivotal angle of the traveling lever 140.)

The supplying of the pilot oil from the traveling operating apparatus 14 to the forward traveling pressure receiving portion 166a and the reverse traveling pressure receiving portion 166b of the HST pump 166 and the returning of the pilot oil from the forward traveling pressure receiving portion 166a and the reverse traveling pressure receiving portion 166b are effected via the shock relieving throttle 177, so sudden changes in the vehicle speed can be avoided.

Further, the engine 29 can be accelerated by an accelerator from the idling rotational speed to a rated rotational speed. When the rotational speed of the engine 29 is increased, the rotational speed of the HST pump 166 is increased, whereby the discharge amount of this HST pump 166 is raised, and the traveling speed is increased.

To the charge pressure supplying passageway (k1), there is connected a bleed circuit 185 (this will be referred to as "a traveling bleed circuit 185" hereinafter).

This traveling bleed circuit 185 includes a bleed oil passageway 185a having one end thereof connected to the charge pressure supplying passageway (k1) and the other end thereof communicated to the oil pan of the housing of the hydraulic drive apparatus 32 and further includes a throttle 185b incorporated in this bleed oil passageway 185a.

The oil of the oil pan of the housing of the hydraulic drive apparatus 32 is returned to the work oil tank 31 via the drain circuit (n1).

The pilot oil discharged from the second pump P2 and supplied to the traveling operating apparatus 14 via the first supplying passageway (c1) is supplied also to the charge circuit (j1) via the charge pressure supplying passageway (k1) and a portion thereof is drained by the traveling bleed circuit 185 through the throttle 185b of this bleed circuit 185.

Incidentally, the oil drained via the traveling bleed circuit 185 could be directly returned to the work oil tank 31. However, as this oil is drained to the inside of the housing of the hydraulic drive apparatus 32 (i.e. the housing of the HST pump 166), cooling of the HST pump 166, etc. is made possible.

Further, the flushing relief valve 161 can be omitted in the hydraulic system described above.

Still further, the other end of the bleed oil passageway 185a can be communicated to the relief oil passageway (o1) for guiding the oil to be drained from the charge relief valve 178 to the oil pan of the housing of the hydraulic drive apparatus 32, With the work machine 1 having the above-described arrangements, when e.g. the work machine 1 is advanced to plunge the bucket 23 into piled-up sand/earth or the like, a load will be applied to the HST motor 157. In this, this load applied to the HST motor 157 will be transmitted via the HST pump 166 to the engine 29, whereby the rotational speed of the engine 29 will drop.

Then, the rotational speed of the second pump P2 will decrease, thus decreasing the discharge amount of this second pump P2 and the ratio of the oil leak from the traveling bleed circuit 185 relative to this discharge amount of the second pump P2 will become larger. As a result, the primary pressure of the traveling operating apparatus 14 will drop and the pilot pressure outputted from the traveling operating apparatus 14 will drop speedily according to the reduction in the rotational speed of the engine 29. With this, the swash plate angle of the HST pump 166 will be automatically adjusted in a speedy manner so as to reduce the rotational speed (i.e. so as to return the swash plate toward its neutral position), thus reducing the load applied to the engine 29. As a result, the stall of the engine 29 can be avoided effectively.

Even if the traveling bleed circuit 185 were not provided, due to the escape of the oil from the flushing throttle 162 and the override characteristics of the charge relief valve 178 (the escape of oil from the charge relief valve 178), there could be provided the anti-stall characteristics for reducing the control pressure of the swash plate of the HST pump 166 in response to reduction in the rotational speed of the engine 29. But, the anti-stall effect of such arrangement would be small.

In contrast, according to the present embodiment, in addition to the escape of the oil from the flushing throttle 162 and the override characteristics of the charge relief valve 178, thanks to the leak of oil from the traveling bleed circuit 185, effective anti-stall characteristics (effective anti-stall performance) can be obtained.

In the case of the arrangement wherein the supplying and discharging of the pilot oil to/from the pressure receiving portions 166a, 166b of the HST pump 166 in order to avoid sudden change in the vehicle speed, when the work machine 1 is advanced to plunge the bucket 23 into piled sand/earth and an excessive load is applied suddenly to the engine 29, if pressure relief of the forward traveling pressure receiving portion 166a is effected via the shock relieving throttle 177, the pressure drop of the forward traveling pressure receiving portion 166a of the HST pump 166 may lag behind the drop of the primary pressure of the traveling operating apparatus 14.

However, in the present embodiment, when the primary pressure of the traveling operating apparatus 14 becomes smaller than the pressure of the forward traveling pressure receiving portion 166a, the check valve 184 provided in the escape oil passageway 183 is opened, thus allowing communication of pressure oil from the first and third connecting oil passageways 179, 181 to the charge pressure supplying passageway (k1), and thus relieving the pressure of the forward traveling pressure receiving portion 166a. Therefore, even when an excessive load is applied suddenly to the engine 29, the swash plate of the HST pump 166 will be returned quickly to the neutral side, so that stall of the engine 29 can be prevented.

Accordingly, in the present invention, the response of the anti-stall feature can be improved with the simple arrangement of providing a check valve in the escape oil passageway 183, while sudden speed change is prevented by the shock relieving throttle 177.

Incidentally, in the present embodiment, the escape circuit comprising the escape oil passageway 183 and the check valve 184 is provided for the forward traveling pressure receiving portion 166a. Instead, this circuit may be provided for the reverse traveling pressure receiving portion 166b.

Further, in the work machine 1 having the above-described construction, when the rotational speed of the engine 29 drops and the discharge amount of the second pump P2 is decreased and due to the anti-stall function by the traveling bleed circuit 185, etc., the primary pressure of the traveling operating apparatus 14 becomes smaller than the set pressure of the pressure compensating valve 155, and thus the pressure compensating valve 155 is closed. However, in the case of the arrangement having no main bleed circuit 156, if the pressure compensating valve 155 is closed in such case as above, there will be no place for allowing escape of the discharge oil from the second pump P2. So, the pressure on the upstream side of the pressure compensating valve 155 becomes high, so the pressure compensating valve 155 will be opened again. And, when the primary pressure of the traveling operating apparatus 14 becomes lower than the set pressure of the pressure compensating valve 155, the pressure compensating valve 155 will be closed. So, these opening/closing operations will be repeated.

In contrast to the above, in the case of the arrangement of the present embodiment wherein the main bleed circuit 156 is provided for draining a portion of the pressure oil on the upstream side of the pressure compensating valve 155, when the rotational speed of the engine 29 drops and the discharge flow rate of the second pump P2 is decreased, thus closing the pressure compensating valve 155, thereafter, due to the leak of the oil from the main bleed circuit 156, the pressure on the upstream side of the pressure compensating valve 155 will not rise, so that the pressure compensating valve 155 will remain closed and the pressure oil from the second pump P2 will not flow to the downstream side of the pressure compensating valve 155 (traveling bleed circuit 185).

Therefore, with the provision of the main bleed circuit 156, it is possible to allow the anti-stall function by the traveling bleed circuit 185 to manifest itself effectively.

The implement operating apparatus 15 includes an arm elevating pilot valve 186, an arm lowering pilot valve 187, a bucket dumping pilot valve 188, a bucket scooping pilot valve 189 and an operating lever (single lever) 190 common to these pilot valves 186, 187, 188, 189.

To each pilot valve 186, 187, 188, 189 of the implement operating apparatus 15, pilot oil from the second pump P2 can be supplied via the fifth supplying passageway (g1), in response to magnetic excitation of an implement lock valve 191 comprising an electromagnetic two-position switching valve; and in response to demagnetization of the implement lock valve 191, supplying of the pressure oil form the second pump P2 becomes disabled, so that the implement operating apparatus 15 becomes inoperable.

The implement lock valve 191, like the traveling lock valve 154 and the brake releasing valve 165, receives a demagnetizing signal by the lock lever operable at the time of driver's getting out of the cabin 5 and receives a magnetizing signal by a release switch.

The implement control valve 33 includes an arm control valve 192 for controlling the lift cylinder 26, a bucket control valve 193 for controlling the bucket cylinder 28, and an auxiliary control valve 194 (this will be referred to as "SP control valve") for controlling a hydraulic actuator of the attachment attached to e.g. the leading end of the arm 22. Each one of the control valves 192, 193, 194 is comprised of a pilot operation type straight moving spool-shaped, three-position switching valve.

The arm control valve 192, the bucket control valve 193 and the SP control valve 194 are incorporated in an implement supplying oil passageway (r1) connected to a discharge passageway (q1) of the first pump P1, in the order of the arm control valve 192, the bucket control valve 193 and the SP control valve 194 from the upstream side, thereby to constitute a serial circuit. In operation, the work oil from the first pump P1 can be supplied to the lift cylinder 26 via the arm control valve 192, or to the bucket cylinder 28 via the bucket control valve 193, or to the hydraulic actuator of the attachment via the SP control valve 194.

The implement supplying passageway (r1) extends through the SP control valve 194 and is then connected to the drain oil passageway (s1).

In the implement supplying passageway (r1), on the upstream side of the arm control valve 192, one end of a bypass oil passageway (t1) is connected. And, the other end of this bypass oil passageway (t1) is connected to the implement supplying oil passageway (r1) more downstream than the SP control valve 194 and the bypass oil passageway (t1) incorporates a relief valve 196 for setting the circuit pressure of this implement supplying oil passageway (r1).

The implement control valve 33 further includes an arm relief valve 197 for protecting the lift cylinder 26, a bucket relief valve 198 for protecting the bucket cylinder 28, and an SP relief valve 199 for protecting a hydraulic actuator of the attachment.

An operating lever 190 of the implement operating apparatus 15 is operable pivotally with inclination from the neutral position in the forward/reverse and right/left directions and along the oblique directions between the forward/reverse and right/left directions. As the operating lever 190 is pivotally operated, each pilot valve 186, 187, 188, 189 of the implement operating apparatus 15 is operated and also a pilot pressure in proportion to the operational amount of the operating lever 190 from the neutral position is outputted from the operated pilot valve 186, 187, 188, 189.

Further, when the operating lever 190 is pivoted rearward (the direction of arrow B1 in FIG. 13), the arm elevating pilot valve 186 is operated and a pilot pressure is outputted from this arm elevating pilot valve 186. This pilot pressure is applied to one pressure receiving portion of the arm control valve 192, whereby this control valve 192 is operated, and the lift cylinder 26 is expanded and the arm 22 is elevated at the speed proportional to the pivoted amount of the operating lever 190.

When the operating lever 190 is pivoted forward (the direction of arrow B2 in FIG. 13), the arm lowering pilot valve 187 is operated and a pilot pressure is outputted from this arm lowering pilot valve 187. This pilot pressure is applied to the other pressure receiving portion of the arm control valve 192, whereby this control valve 192 is operated, and the lift cylinder 26 is contracted and the arm 22 is lowered at the speed proportional to the pivoted amount of the operating lever 190.

When the operating lever 190 is pivoted to the right (the direction of arrow B3 in FIG. 13), the bucket dumping pilot valve 188 is operated and a pilot pressure is outputted from this pilot valve 188. This pilot pressure is applied to the dumping side pressure receiving portion 193a of the bucket control valve 193, whereby this control valve 193 is operated, and the bucket cylinder 28 is expanded and the bucket 23 effects a dumping action (downward pivotal action) at the speed proportional to the pivoted amount of the operating lever 190.

When the operating lever 190 is pivoted to the left (the direction of arrow B4 in FIG. 13), the bucket scooping pilot valve 189 is operated and a pilot pressure is outputted from this pilot valve 189. This pilot pressure is applied to the scooping side pressure receiving portion 193b of the buck control valve 193, whereby this control valve 193 is operated, and the bucket cylinder 28 is contracted and the bucket 23 effects a scooping action (upward pivotal action or a raking-in action) at the speed proportional to the pivoted amount of the operating lever 190.

Further, when the operating lever 190 is pivoted in the oblique direction, composite actions of the elevating/lowering action of the arm 22 and the scooping/dumping action is made possible.

The bucket control valve 193 comprises a five-port, three-position switching valve including first and second pump ports 201, 202 for receiving pressure oil from the first pump P1, a cylinder port 203 (this will be referred to as "a scooping port") communicated to the rod side oil chamber 28a of the bucket cylinder 28, a cylinder port 204 (this will be referred to as "a dumping port") communicated to the bottom side oil chamber 28b of the bucket cylinder 28, and a tank port 205 communicated to the drain oil passageway (s1) via the SP control valve 194; and switchable into a neutral position 193A for not operating the bucket 23, a scooping position 193B for causing the bucket 23 to effect a scooping action and a dumping position 193C for causing the bucket 23 to effect a dumping action.

With this bucket control valve 193 in operation, at the neutral position 193A, communication between the first pump port 201 and the tank port 205 is established and also the second pump port 202, the scooping port 203 and the dumping port 204 are shut. At the scooping position 193B, communication is established between the second pump port 202 and the scooping port 203 is established and also communication is established between the tank port 205 and the dumping port 204, whereby pressure oil is supplied to the rod side oil chamber 28a of the bucket cylinder 28 and also the pressure oil is discharged from the bottom side oil chamber 82b. At the dumping position 193C, communication is established between the second pump port 202 and the dumping port 204 and also communication is established between the tank port 205 and the scooping port 203, whereby the pressure oil is supplied to the bottom side oil chamber 28b of the bucket cylinder 28 and also the pressure oil is discharged from the rod side oil chamber 28a.

Further, the first pump port 201 is shut at the dumping position 193C of the bucket control valve 193, but at the scooping position 193B, the first pump port 201 is communicated to the tank port 205 via a bleed circuit 206 (this will be referred to as "a bucket bleed circuit"), and at this scooping position 193B, a portion of the pressure oil supplied from the first pump P1 to the bucket cylinder 28 is drained via this bucket bleed circuit 206.

This bucket bleed circuit 206 includes a bleed oil passageway 206a communicating the first pump port 201 to the tank port 205, and a throttle 206b incorporated in this bleed oil passageway 206a.

Further, at the scooping position 193B of the bucket control valve 193, one end of the return oil passageway 207 for returning the oil discharged from the bottom side oil chamber 28b of the bucket cylinder 28 to the tank port 205 is communicated to the dumping port 204 and the other end of the return oil passageway 207 is connected to the upstream side of the throttle 206b in the bleed oil passageway 206a.

Further, this return oil passageway 207 incorporates a check valve 208 for checking communication of pressure oil from the bleed oil passageway 206a to the dumping port 204.

With the bucket control valve 193 having the above-described construction, when the bucket 23 is caused to effect a scooping action, if the engine 29 is at a high rotational speed (e.g. the rated rotation: 2400 rpm), the amount of leak from the bucket bleed circuit 206 is small relative to the discharge flow amount of the first pump P1 (i.e. there is hardly any drop in the pressure of the pressure oil supplied from the first pump P1 to the bucket cylinder 28), a high-load operating for the scooping action of the bucket 23 is possible. However, as the rotational speed of the engine 29 decreases, the ratio of the leak amount from the bucket bleed circuit 206 relative to the discharge flow amount of the first pump P1 progressively increases, so that the pressure drop of the pressure oil supplied from the first pump P1 to the bucket cylinder 28 becomes larger, so high-load operation becomes impossible.

With this, the work load of the bucket 23 falls automatically in association with the drop in the rotational speed of the engine. Hence, the load to the first pump P1 is alleviated and the consumption torque of the engine 29 will decrease.

The leak amount of the bucket bleed circuit 206 (the diameter of the throttle 206b) will be set such that e.g. at the time of idling rotation of the engine 29, the maximum pressure of the pressure oil supplied from the first pump P1 to the bucket cylinder 28 at the time of scooping action may be maintained at a pressure substantially equal to the set pressure of the main relief valve 196 (in other words, when the rotational speed of the engine is below the idling rotational speed, the main relief valve 196 will not be opened at the time of scooping action).

Further, in the case of the above-described construction, the bucket 23 is caused to effect a scooping action by supplying the pressure oil to the rod side oil chamber 28a of the bucket cylinder 28 for contracting this bucket cylinder 28

(retracting the piston rod of the bucket cylinder 28). So, the speed of the action of the bucket 23 (bucket cylinder 28) is higher at the time of the scooping action than the time of dumping action, in case the bucket bleed circuit 206 is not provided. Therefore, even if the pressure oil from the first pump P1 is leaked by the bucket bleed circuit 206, there occurs no problem in the work speed matching between the scooping action and the dumping action times of the bucket 23.

In the case of an arrangement where the bucket bleed circuit 206 is not provided, when the work machine 1 is advanced to plunge the bucket 23 into piled sand/earth and the bucket 23 is caused to effect a scooping action and the bucket relief valve 198 is opened, the provision of the traveling bleed circuit 185 alone may not be sufficient to cope with engine stall. However, by providing the bucket bleed circuit 206 in addition to the traveling bleed circuit 185, when the work machine 1 is advanced and the bucket 23 is plunged into pile of sand/earth to effect a scooping action, the load to the engine 29 is alleviated by the traveling bleed circuit 185 and further the load to the first pump P1 is alleviated by the bucket bleed circuit 206, so that the load of the engine 29 can be alleviated more. With these combined, the stall of the engine 29 in case the work machine 1 is advanced and the bucket 23 is plunged into pile of sand/earth to effect a scooping action (a situation when high load is applied to the HST pump 166 and the first pump P1 simultaneously) can be prevented effectively.

Further, in the case of the arrangement as in the present embodiment wherein the arm control valve 192 is provided on the upstream side of the bucket control valve 193, when the arm control valve 192 effects a full stroke action, the pressure oil from the first pump P1 does not flow to the bucket control valve 193, so the above-described effect of the bucket bleed circuit 206 is disabled. So, it may not be possible to cope with the engine stall when the work machine 1 is advanced to plunge the bucket 23 into piled sand/earth and the bucket 23 is caused to effect a scooping action and the arm relief valve 197 is opened with the spool of the arm control valve 192 making a full stroke action.

However, to cope with such a problem as above, in the case of the work machine 1 of this embodiment, since the main bleed circuit 156 is provided on the upstream side of the pressure compensating valve 155 for draining a portion of the pilot oil supplied from the second pump P2 to the implement operating apparatus 15, when the rotational speed of the engine 29 drops below the idling rotation, the pressure of the fifth supplying passageway (g1) may drop below the pressure set by the pressure compensating valve 155.

With the above-described arrangement, the primary and second pressures of the implement operating apparatus 15 will decrease and the pilot pressure outputted from the implement operating apparatus 15 prevents full stroke actions of the spools of the arm control valve 192 and the bucket control valve 193.

And, as the result of the spool of the arm control valve 192 making no full stroke action, with communication of the pressure oil to the bucket control valve 193 from the arm control valve 192 via the implement supplying oil passageway (r1), the effect of the bucket bleed circuit 206 is allowed to manifest itself, such that rise in the pressure of the pressure oil discharged from the first pump P1 is restricted, thus alleviating the load to the engine 29. Consequently, it is possible to effectively prevent occurrence of engine stall in case the work machine 1 is advanced and the bucket 23 is caused to effect a scooping action and the arm 22 is operated.

Further, since the main bleed circuit 156 functions to prevent full stroke action of the spool of the arm control valve 192 by the pilot pressure outputted from the implement operating apparatus 15 in case the rotational speed of the engine 29 drops below the idling rotation, even in such case when the bucket 23 is not operated at all, but high load is applied to the traveling apparatuses 4 and high load is applied to the arm 22 as being operated, a portion of the pressure oil supplied from the first pump P1 to the lift cylinder 26 via the arm control valve 192 is caused to pass the bucket control valve 193 into the drain oil passageway (s1), and the pressure of the pressure oil from the first pump P1 will drop, so that the load to the first pump P1 can be alleviated (the load to the engine 29 can be alleviated), so stall of the engine 29 can be prevented effectively.

Incidentally, as described hereinbefore, since the diameter of the throttle 156a of the main bleed circuit 156 is set such that even at the time of idling rotation of the engine 29, the pressure of the fifth supplying passageway (g1) can be maintained at the set pressure of the pressure compensating valve 155, it is possible to ensure pressure sufficient to allow the spools of the arm control valve 192 and the bucket control valve 193 to effect full stroke actions even at the time of idling rotation of the engine 29.

Further Embodiment of the Hydraulic System of the Implement Line

In the foregoing embodiment, the main bleed circuit 156 constitutes pressure reducing means for reducing the primary pressure of the implement operating apparatus 15 when the rotational speed of the engine 29 drops.

Figure 15:
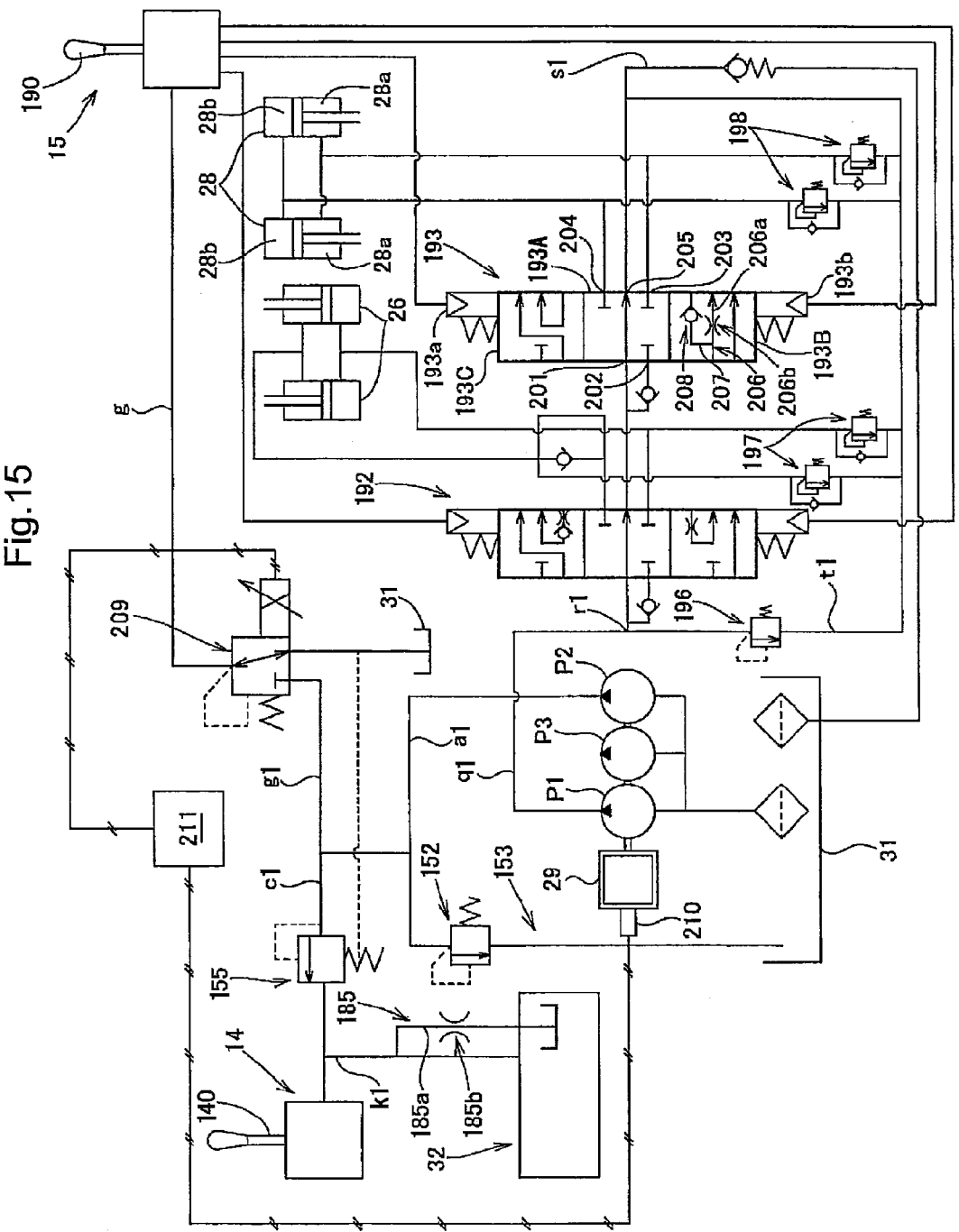

On the other hand, in the case of a hydraulic system depicted in FIG. 15, as means for coping with engine stall (as "pressure reducing means") when the work machine 1 is advanced to plunge the bucket 23 into piled sand/earth and the bucket 23 is caused to effect a scooping action and the arm 22 is operated, instead of the main bleed circuit 156, the primary pressure of the implement operating apparatus 15 is controlled by a pressure reducing valve 209.

The pressure reducing valve 209 comprises an electromagnetic proportional pilot operation type pressure reducing valve 209, which is incorporated in the fifth supplying passageway (g1).

Moreover, in the hydraulic system of the embodiment, there are provided a rotation sensor 210 for detecting rotational speed of the engine 29 and a controller 211 for controlling the pressure reducing valve 209. A rotational speed of the engine 29 detected by the rotation sensor 210 is inputted to the controller 211.

Further, the implement lock valve 191 is not provided, but the pressure reducing valve 209 provides the role of this implement lock valve 191.

In the case of the hydraulic system shown in FIG. 15, when the rotational speed of the engine 29 is higher than the idling rotation speed, the controller 211 generates an instruction signal for rendering the pressure reducing valve 209 into its full open condition (no pressure adjustment), so that the primary pressure of the implement operating apparatus 15 is maintained at the set pressure of the pressure compensating valve 155.

And, when the rotational speed of the engine 29 drops below the idling rotation speed, the controller 211 will generate an instruction signal for causing the pressure reducing valve 209 to effect pressure adjustment such that the primary pressure of the implement operating apparatus 15 may drop below the set pressure of the pressure compensating valve 155 (e.g. the pressure may drop in proportion to the amount of reduction in the rotational speed of the engine 29).

The rest of the construction of this embodiment is identical to that of the hydraulic system of the embodiment shown in FIGS. 4-5 and FIGS. 10-14.

The construction of the above-described embodiments can be applied to any other self-propelled type work machine, e.g. a work machine such as a backhoe, having a traveling apparatus operated by a hydraulic motor driven by discharge oil from a hydraulic pump driven by an engine, and a work implement hydraulically driven by the discharge oil from a hydraulic pump driven by the engine.

The invention claimed is:

1. A work machine having a traveling apparatus and a work implement driven by an engine,
   wherein a hydraulic system mounted on the work machine comprises:
   an HST pump comprising a swash plate, variable displacement pump driven by the engine,
   an HST motor connected in a closed circuit to the HST pump and a pair of speed-changing oil passageways, the HST motor being driven by an amount of oil supplied by the HST pump, thereby to drive the traveling apparatus,
   a main pump driven by the engine, the main pump supplying pressure oil to the work implement,
   a pilot pump driven by the engine,
   a swash plate positioning circuit configured to effect positioning of a swash plate of the HST pump with pilot oil supplied from the pilot pump, and
   a bleed circuit configured to drain, via a throttle, a portion of the pilot oil supplied to the swash plate positioning circuit.

2. The work machine according to claim 1, wherein the hydraulic system further comprises:
   a charge relief valve for determining the circuit pressure of a charge circuit for supplementing an amount of oil from the pilot pump to the speed-changing oil passageways, and
   a flushing throttle incorporated in a flushing relief oil passageway for draining oil from a flushing valve configured to allow escape of a portion of work oil in the low-pressure side oil speed-changing passageway of the speed-changing oil passageways.

3. The work machine according to claim 2, wherein the flushing relief oil passageway incorporates a flushing relief valve disposed between the flushing valve and the flushing throttle.

4. The work machine according to claim 1, wherein:
   the HST motor comprises a swash plate, variable displacement motor switchable between a first speed state and a second speed state, according to the positioning of the swash plate by pilot oil, and
   for switching over the HST motor from the first speed state to the second speed state, there is provided a second bleed circuit for draining, through a throttle, a portion of pilot oil supplied from the pilot pump.

5. The work machine according to clam 1, wherein:
   the work implement comprises a bucket capable of effecting a scooping/dumping action; and
   the hydraulic system includes a bucket cylinder for causing the bucket to effect a scooping/dumping action and a bucket control valve for controlling the bucket cylinder; and
   wherein in a hydraulic circuit at a scooping position where the bucket is caused to effect a scooping action by the bucket control valve, there is provided a bucket bleed circuit for draining, through a throttle, a portion of the pressure oil supplied from the main pump to the bucket cylinder.

6. The work machine according to claim 5, wherein at the scooping position of the bucket control valve, the pressure oil from the main pump is supplied to a rod side oil chamber of the bucket cylinder.

7. The work machine according to claim 6, wherein:
   the bucket control valve includes two pump ports for inputting the pressure oil from the main pump, two cylinder ports for supplying/discharging pressure oil to/from the rod side oil chamber and a bottom side oil chamber of the bucket cylinder, and a tank port communicated to a tank; and
   at the scooping position of the bucket control valve, one of the pump ports becomes communicated to the tank port via the bucket bleed circuit and also the other pump port becomes communicated to the cylinder port connected to the rod side oil chamber of the bucket cylinder.

8. The work machine according to claim 7, wherein the bucket control valve includes a return oil passageway for returning the oil discharged from the bottom side oil chamber of the bucket cylinder to the upstream side of the throttle of the bucket bleed circuit via a check valve, at the scooping position.

9. The work machine according to claim 5, wherein:
   the work implement includes the bucket at a leading end of an arm which is pivoted up/down by a lift cylinder operable by the pressure oil from the main pump; and
   the hydraulic system further comprises:
   a lift cylinder for pivoting up/down the arm with the pressure oil from the main pump,
   an arm control valve for controlling the lift cylinder;
   a work implement operating apparatus for operating the arm control valve and the bucket control valve;
   pressure reducing means for reducing a primary pressure of the work implement operating apparatus for preventing full stroke action of the arm control valve, in response to drop in rotational speed of the engine;
   wherein said arm control valve and said bucket control valve are disposed in series in a work implement supplying oil passageway for supplying the pressure oil discharged from the main pump, with the arm control valve being disposed on the upstream side of the bucket control valve.

10. The work machine according to claim 1, wherein:
    the work implement comprises a bucket capable of effecting a scooping/dumping action; and
    the hydraulic system includes a bucket cylinder for causing the bucket to effect a scooping/dumping action and a bucket control valve for controlling the bucket cylinder;
    the bucket control valve includes two pump ports for inputting the pressure oil from the main pump, two cylinder ports for supplying/discharging pressure oil to/from a rod side oil chamber and a bottom side oil chamber of the bucket cylinder, and a tank port communicated to a tank;
    at the scooping position of the bucket control valve, one of the pump ports becomes communicated to the tank port via the bucket bleed circuit and also the other of the pump ports becomes communicated to the cylinder port connected to the rod side oil chamber of the bucket cylinder.

11. The work machine according to claim 1, wherein
    there is provided a traveling operating apparatus for controlling pilot oil in the swash plate positioning circuit;

there is provided a work implement operating apparatus for controlling the pilot pressure to a control valve for controlling the work implement;

a hydraulic passageway is branched so as to supply the discharge oil from the pilot pump to the traveling operating apparatus and the work implement operating apparatus, and in a hydraulic circuit between this branching point and the traveling operating apparatus, there is provided a pressure compensating valve for ensuring a primary pressure for the work implement operating apparatus, and on the upstream side of the pressure compensating valve, there is provided a work implement bleed circuit for draining, through a throttle, a portion of the pressure oil discharged by the pilot pump and supplied to the work implement operating apparatus.

12. The work machine according to claim 1, wherein there is provided a traveling operating apparatus for controlling pilot oil in the swash plate positioning circuit;

there is provided a work implement operating apparatus for controlling the pilot pressure to a control valve for controlling the work implement;

a hydraulic passageway is branched so as to supply the discharge oil from the pilot pump to the traveling operating apparatus and the work implement operating apparatus, and in a hydraulic circuit between this branching point and the traveling operating apparatus, there is provided a pressure compensating valve for ensuring a primary pressure for the work implement operating apparatus, and on the upstream side of the work implement operating apparatus, there is provided a pressure reducing valve capable of pressure adjustment so as to allow drop of the primary pressure of the work implement operating apparatus.

13. The work machine according to claim 1, wherein:

there is provided a traveling operating apparatus for controlling the pilot oil in the swash plate positioning circuit;

the HST pump includes a pair of pressure receiving portions for receiving the pilot pressure from the traveling operating apparatus via a shock relieving throttle, and the angle of the swash plate is controlled by pressure difference between these pressure receiving portions, in the course of which in association with reduction in the rotational speed of the engine, the primary pressure of the traveling operating apparatus drops and the swash plate of the HST pump returns to the neutral side, thus preventing engine stall; and there is provided an escape oil passageway having one end thereof communicated to a primary side hydraulic passageway of the traveling operating apparatus and the other end thereof communicated to a hydraulic passageway between the shock relieving throttle and one of the pressure receiving portions, and the escape oil passageway incorporates a check valve which is opened when the pressure of the one pressure receiving portion to which the other end of the escape oil passageway is communicated is greater than the primary pressure of the traveling operating apparatus.

* * * * *

UNITED STATES PATENT AND TRADEMARK OFFICE
CERTIFICATE OF CORRECTION

| | | |
|---|---|---|
| PATENT NO. | : 8,495,870 B2 | Page 1 of 1 |
| APPLICATION NO. | : 12/724941 | |
| DATED | : July 30, 2013 | |
| INVENTOR(S) | : Ryohei Sumiyoshi et al. | |

It is certified that error appears in the above-identified patent and that said Letters Patent is hereby corrected as shown below:

In the Claims

Column 29, Line 58, Claim 5, delete "clam 1," and insert -- claim 1, --

Signed and Sealed this
Seventh Day of January, 2014

Margaret A. Focarino
*Commissioner for Patents of the United States Patent and Trademark Office*